(12) United States Patent
Otomasu

(10) Patent No.: US 12,248,340 B2
(45) Date of Patent: Mar. 11, 2025

(54) INFORMATION PROCESSING APPARATUS, INFORMATION PROCESSING METHOD, AND INFORMATION PROCESSING PROGRAM

(71) Applicant: Sony Group Corporation, Tokyo (JP)

(72) Inventor: Katsuya Otomasu, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/631,892

(22) PCT Filed: Aug. 16, 2019

(86) PCT No.: PCT/JP2019/032187
§ 371 (c)(1),
(2) Date: Feb. 1, 2022

(87) PCT Pub. No.: WO2021/033221
PCT Pub. Date: Feb. 25, 2021

(65) Prior Publication Data
US 2022/0291723 A1    Sep. 15, 2022

(51) Int. Cl.
*G06F 1/16* (2006.01)
*G06F 3/04842* (2022.01)

(52) U.S. Cl.
CPC .......... *G06F 1/1677* (2013.01); *G06F 1/1652* (2013.01); *G06F 3/04842* (2013.01)

(58) Field of Classification Search
CPC ................. G06F 1/1677; G06F 1/1652; G06F 3/04842
See application file for complete search history.

(56) References Cited

U.S. PATENT DOCUMENTS 9,467,848 B1 * 10/2016 Song ...................... G06F 21/629
10,216,398 B2 * 2/2019 Woo ....................... G09G 5/373
(Continued)

FOREIGN PATENT DOCUMENTS

| CN | 104461444 A | 3/2015 |
|---|---|---|
| CN | 106557244 A | 4/2017 |

(Continued)

OTHER PUBLICATIONS

International Search Report and Written Opinion mailed on Nov. 19, 2019, received for PCT Application PCT/JP2019/032187, Filed on Aug. 16, 2019, 16 pages including English Translation.

*Primary Examiner* — Jeremy L Stanley
(74) *Attorney, Agent, or Firm* — XSENSUS LLP

(57) ABSTRACT

An information processing apparatus (10) according to the present application includes: a detection unit (151) that detects a stretching operation on a display device having flexibility so as to be able to be stretched from a state of being wound in a tubular shape; and a display control unit (153) that displays a plurality of pieces of content in parallel in a stretching region stretched by the stretching operation, in accordance with a mode of the stretching operation detected by the detection unit (151). Furthermore, the detection unit (151) detects a size of the stretching region that changes in accordance with the stretching operation. The display control unit (153) displays the plurality of pieces of content in parallel in the stretching region in accordance with the size of the stretching region detected by the detection unit (151).

19 Claims, 19 Drawing Sheets

(56) References Cited

U.S. PATENT DOCUMENTS

| | | | |
|---|---|---|---|
| 10,929,009 B2* | 2/2021 | Lim | G06F 3/0485 |
| 11,379,116 B2* | 7/2022 | Park | G06F 3/0412 |
| 2010/0033435 A1* | 2/2010 | Huitema | G09F 9/301 |
| | | | 345/173 |
| 2012/0139815 A1* | 6/2012 | Aono | G06F 1/1616 |
| | | | 345/1.3 |
| 2012/0197883 A1 | 8/2012 | Robinson | |
| 2013/0314387 A1* | 11/2013 | Kwack | G09G 5/005 |
| | | | 345/207 |
| 2013/0314762 A1* | 11/2013 | Kwack | G09F 9/30 |
| | | | 359/280 |
| 2014/0218375 A1* | 8/2014 | Kim | G06F 3/0488 |
| | | | 345/501 |
| 2014/0247229 A1* | 9/2014 | Cho | G06F 1/1652 |
| | | | 345/173 |
| 2015/0031417 A1* | 1/2015 | Lee | H04W 4/12 |
| | | | 455/566 |
| 2015/0074606 A1* | 3/2015 | Melen | G06F 3/0485 |
| | | | 715/835 |
| 2015/0220118 A1* | 8/2015 | Kwak | G09F 9/301 |
| | | | 345/520 |
| 2016/0033999 A1* | 2/2016 | Browning | G09G 3/20 |
| | | | 345/667 |
| 2016/0274748 A1 | 9/2016 | Feng | |
| 2016/0299531 A1* | 10/2016 | Vertegaal | G06F 3/04886 |
| 2017/0011714 A1 | 1/2017 | Eim | |
| 2017/0039168 A1* | 2/2017 | Hassan | G06Q 10/10 |
| 2017/0091340 A1* | 3/2017 | Yoon | G06F 3/04847 |
| 2017/0103735 A1* | 4/2017 | Oh | G09G 5/006 |
| 2017/0154609 A1* | 6/2017 | Yoon | G06F 3/0483 |
| 2017/0212607 A1* | 7/2017 | Yoon | G06F 3/147 |
| 2018/0217679 A1* | 8/2018 | Kwon | G06V 40/10 |
| 2018/0314417 A1* | 11/2018 | Lim | G06F 3/04883 |
| 2018/0348881 A1* | 12/2018 | Chung | H04W 88/02 |
| 2018/0359350 A1* | 12/2018 | Kim | H04M 1/72403 |
| 2018/0364827 A1* | 12/2018 | Chung | G06F 1/1677 |
| 2018/0374452 A1* | 12/2018 | Choi | G06F 3/04886 |
| 2019/0012008 A1* | 1/2019 | Yoon | G06F 1/1652 |
| 2019/0042014 A1* | 2/2019 | Ohata | G06F 3/041 |
| 2019/0073113 A1* | 3/2019 | Yang | G06F 3/04886 |
| 2019/0261519 A1* | 8/2019 | Park | H04M 1/0268 |
| 2020/0264773 A1* | 8/2020 | Kim | G06F 3/38 |
| 2020/0365063 A1* | 11/2020 | Park | G06F 1/1601 |
| 2020/0402434 A1* | 12/2020 | Yamazuki | G06F 1/1626 |
| 2021/0004156 A1* | 1/2021 | Park | G06F 3/0412 |
| 2021/0278955 A1* | 9/2021 | Lee | H04M 1/72403 |
| 2021/0311610 A1* | 10/2021 | Zhang | G06F 3/0488 |
| 2022/0360654 A1* | 11/2022 | Xiong | H04M 1/72436 |

FOREIGN PATENT DOCUMENTS

| | | |
|---|---|---|
| CN | 106687913 A | 5/2017 |
| CN | 108351706 A | 7/2018 |
| EP | 3147772 A1 | 3/2017 |
| EP | 3401898 A1 | 11/2018 |
| KR | 10-2017-0036317 A | 4/2017 |
| KR | 10-2017-0083404 A1 | 7/2017 |
| WO | 2017/099276 A1 | 6/2017 |
| WO | 2017/119529 A1 | 7/2017 |
| WO | 2017/134890 A1 | 8/2017 |

* cited by examiner

FIG.3
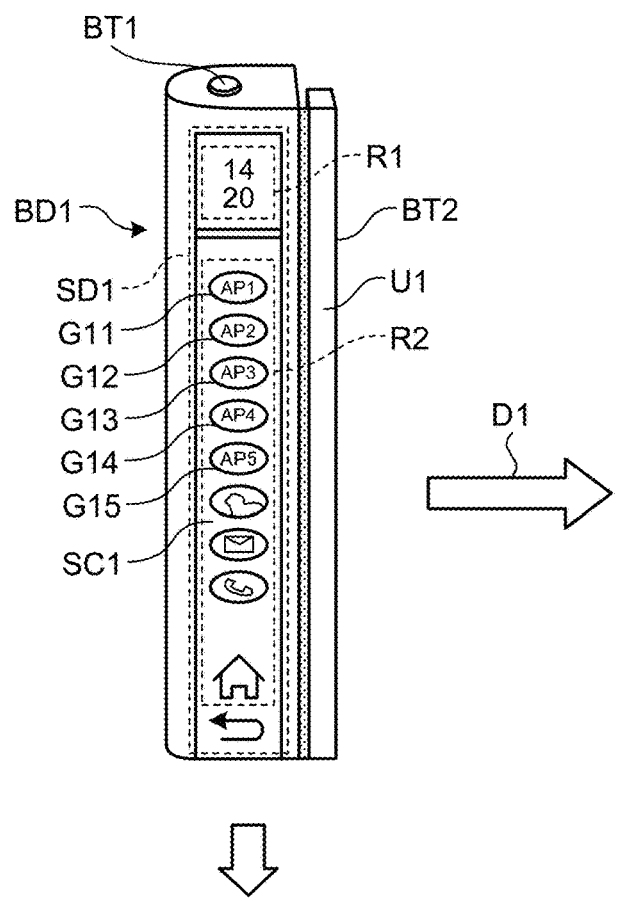
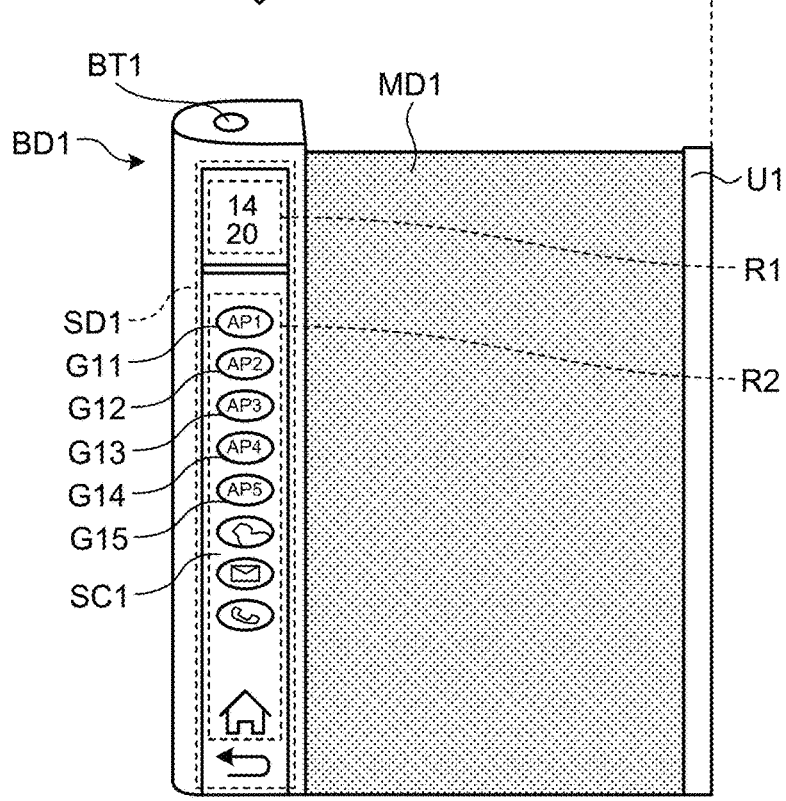

FIG.8
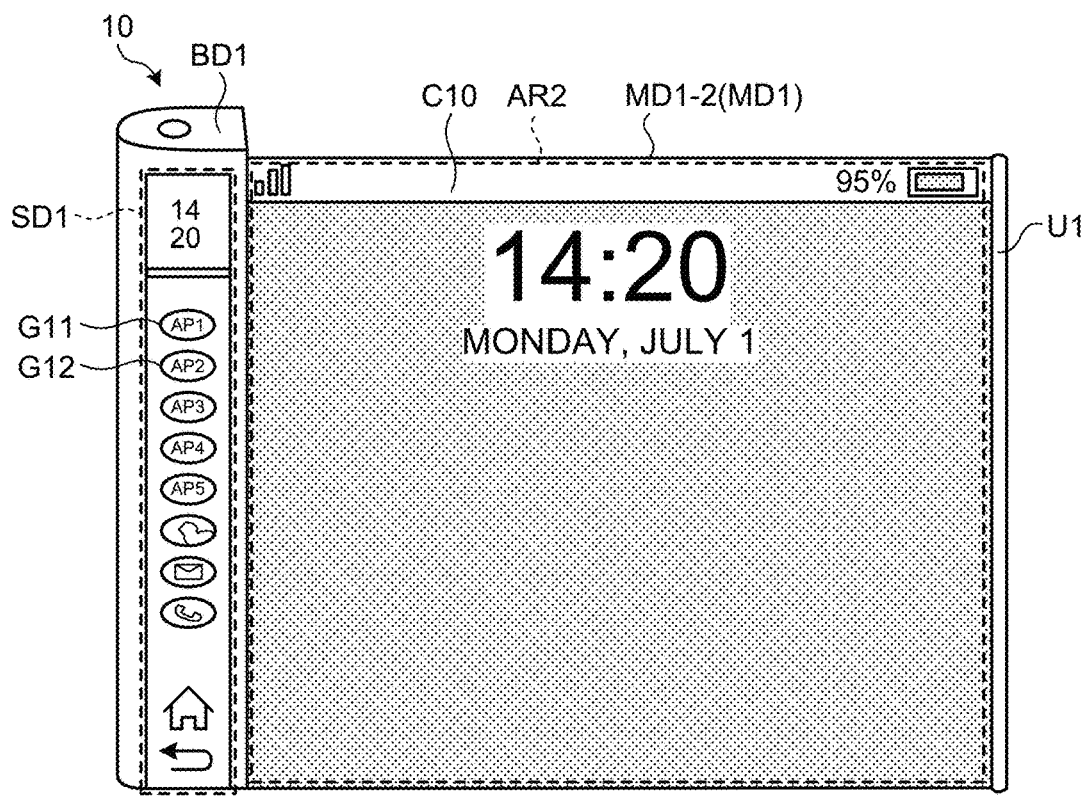
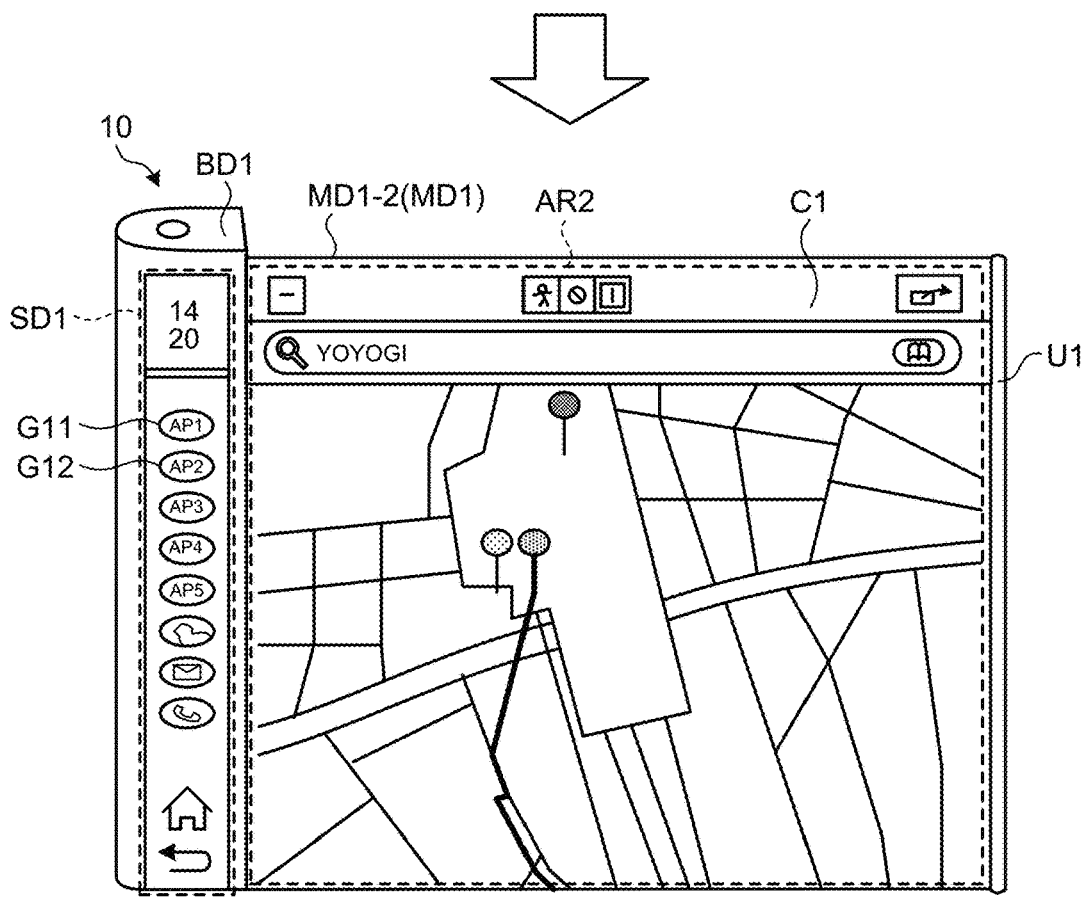

FIG.9
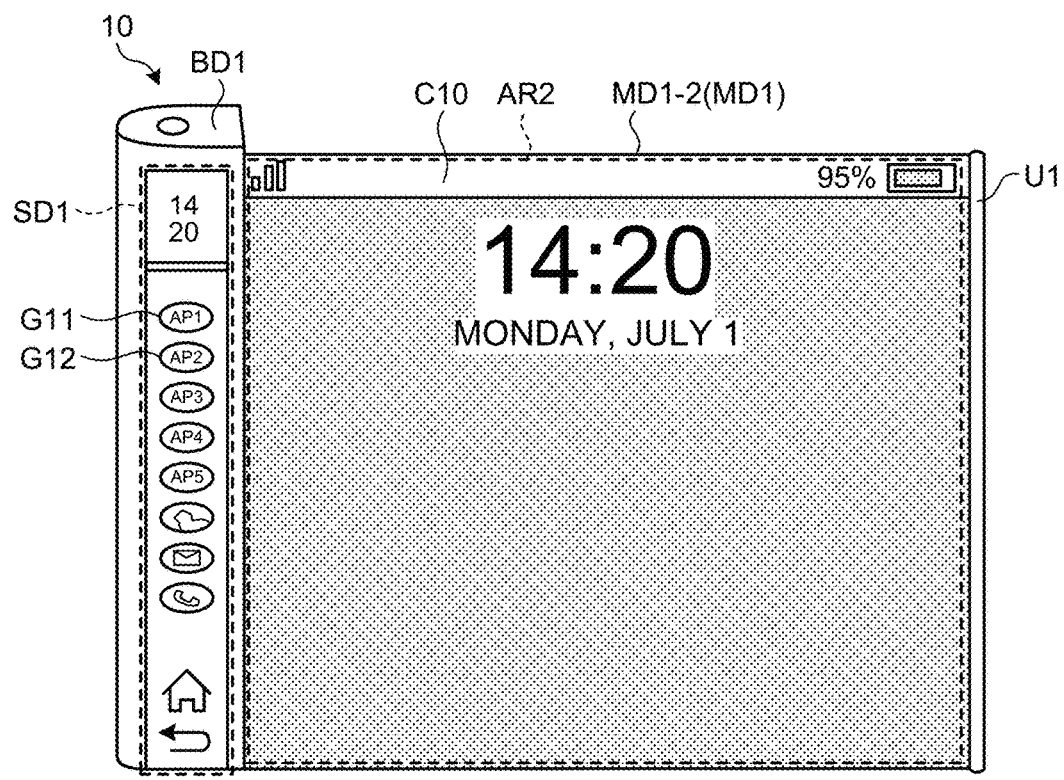
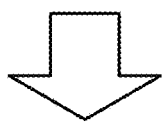
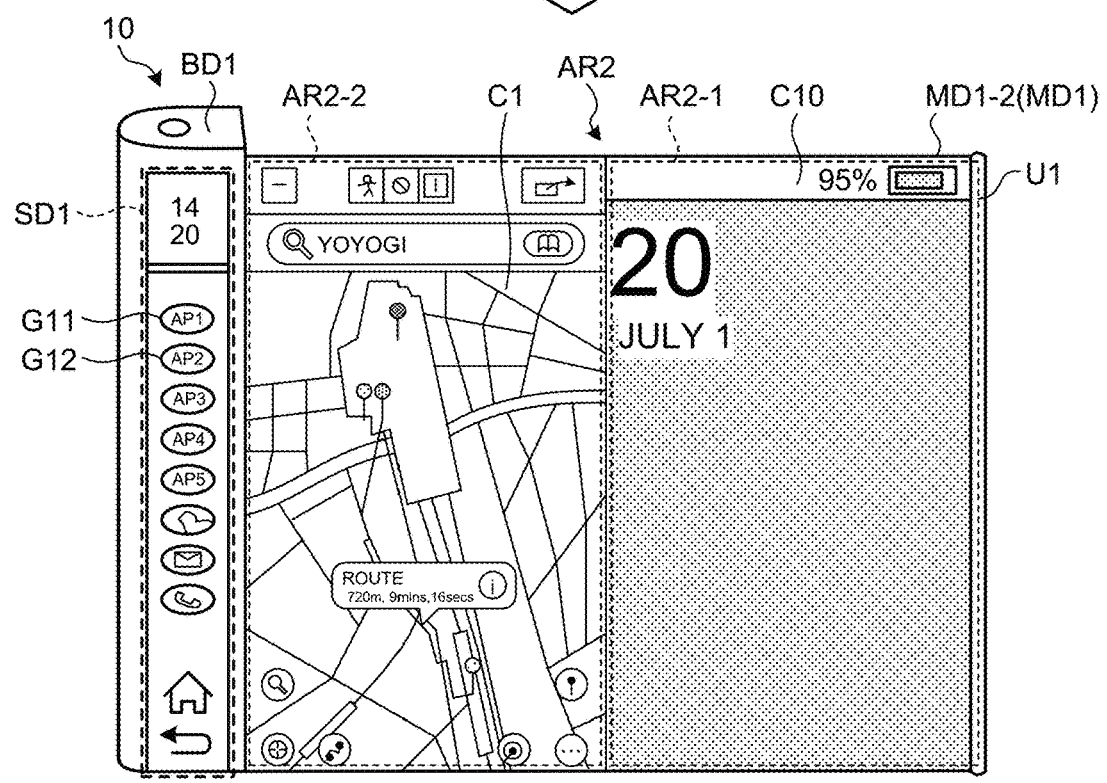

FIG.10
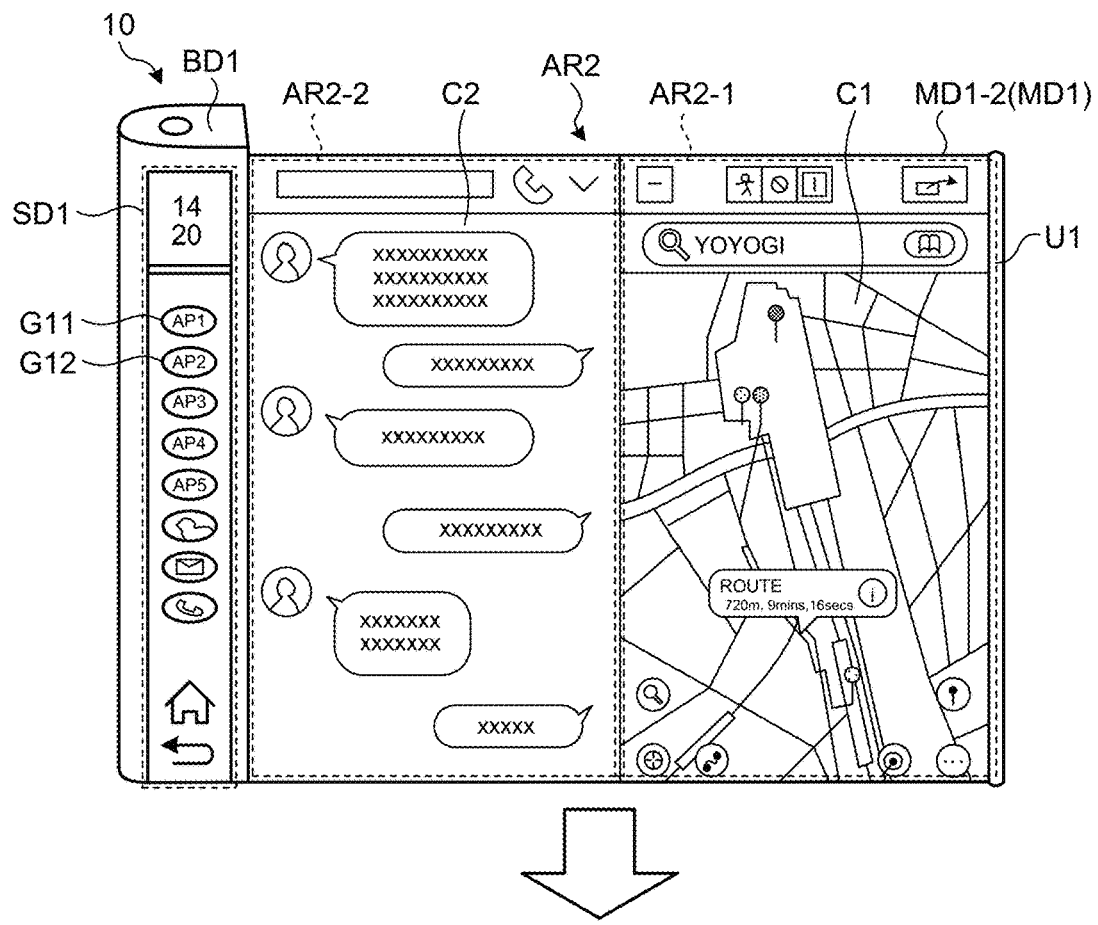
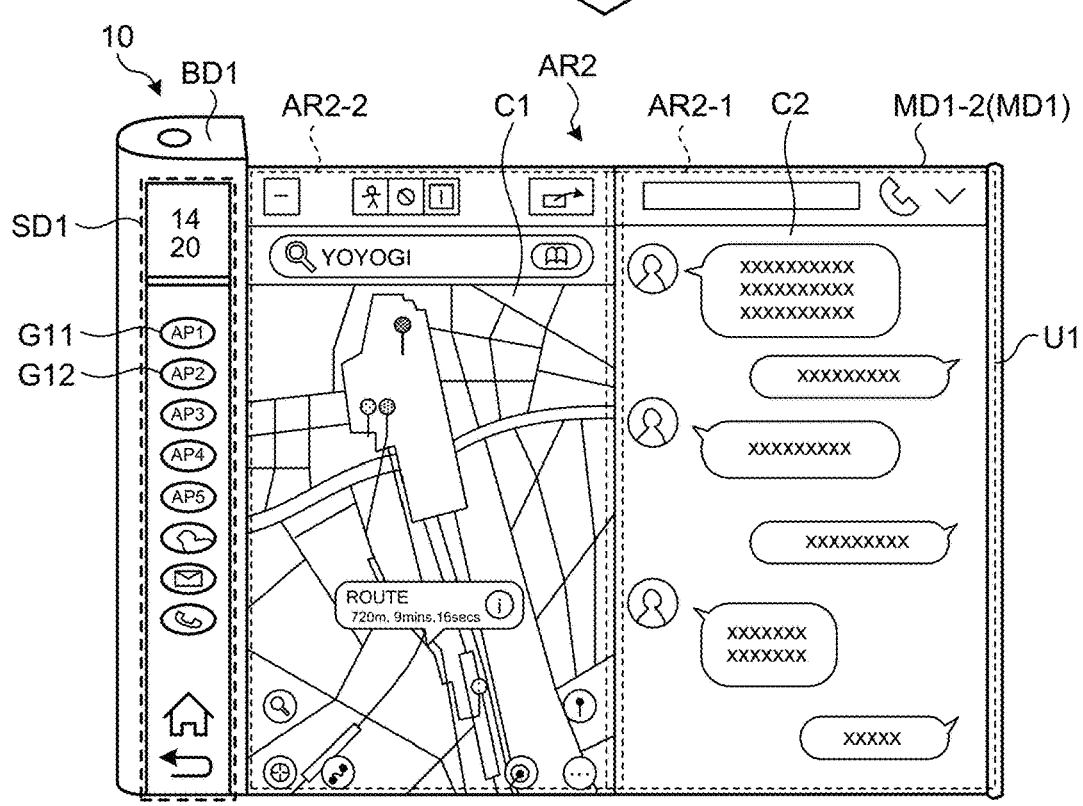

FIG.11
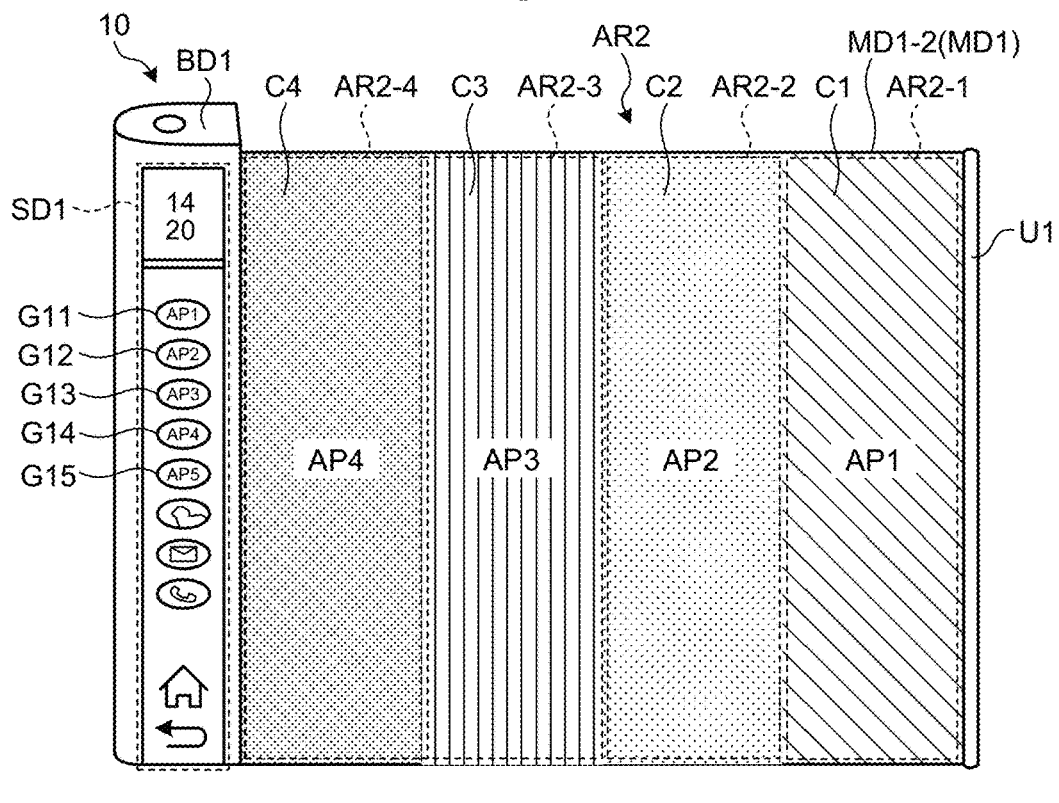
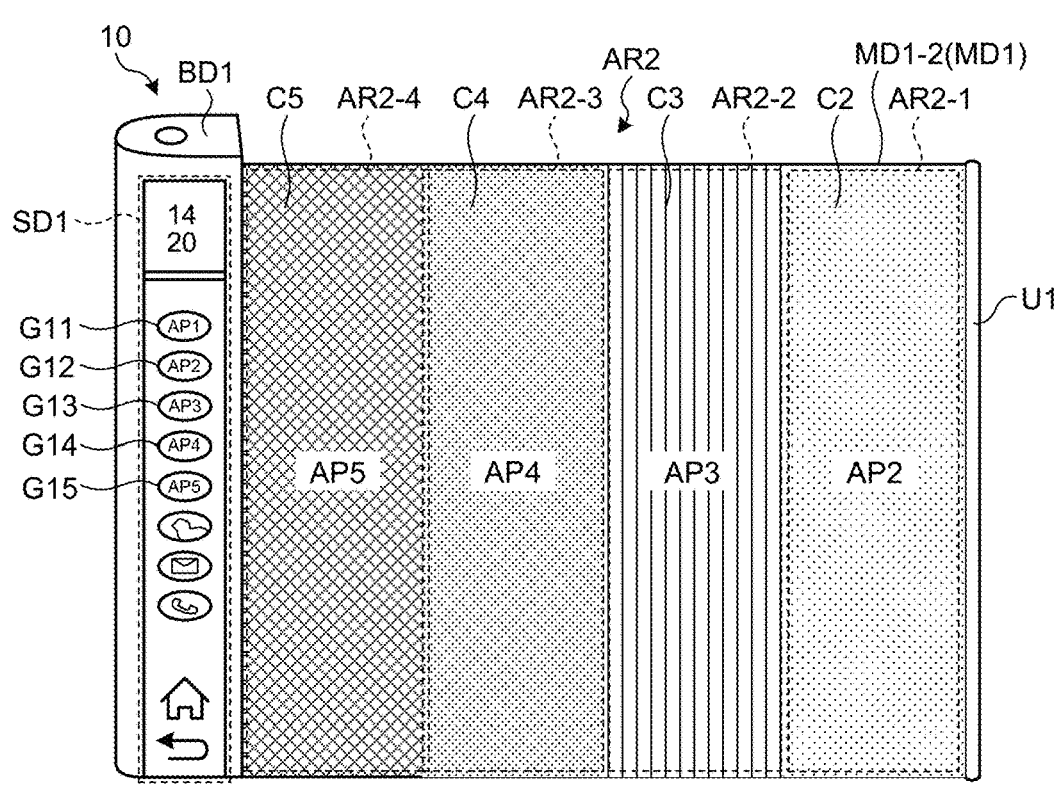

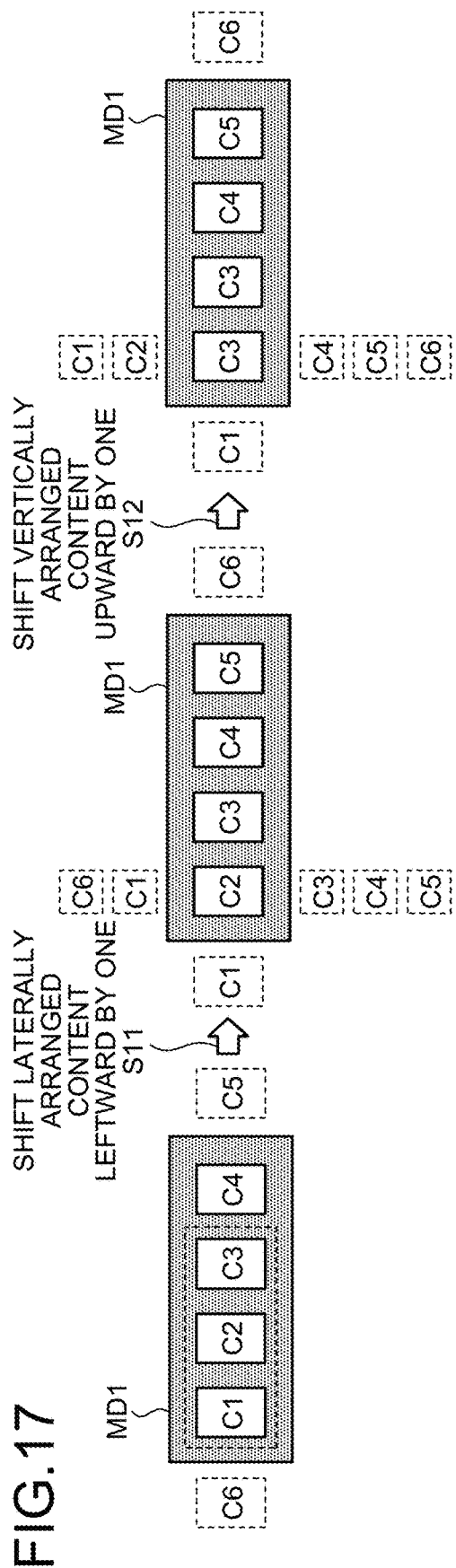
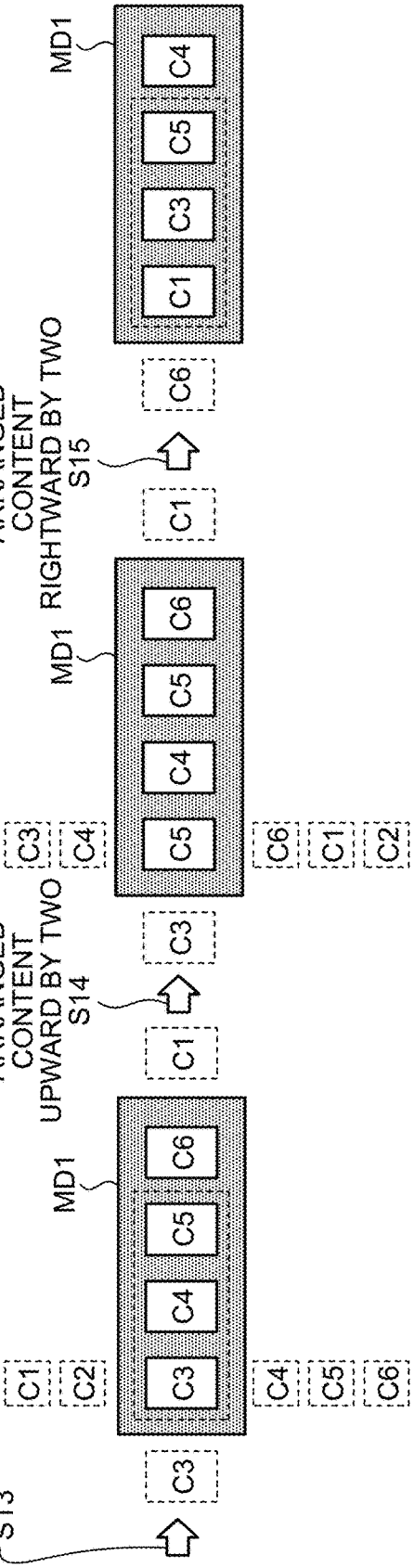
FIG.17

INFORMATION PROCESSING APPARATUS, INFORMATION PROCESSING METHOD, AND INFORMATION PROCESSING PROGRAM

CROSS-REFERENCE TO RELATED APPLICATION

The present application is based on PCT/JP2019/032187 filed on Aug. 16, 2019, the entire contents of which are incorporated herein by reference.

FIELD

The present disclosure relates to an information processing apparatus, an information processing method, and an information processing program.

BACKGROUND

As illustrated in a prior art, there is a known technique of controlling display modes of display devices having various shapes. For example, there has been a proposed technique of controlling a display mode of a foldable display device.

CITATION LIST

Patent Literature

Patent Literature 1: US 2012/0139815 A

SUMMARY

Technical Problem

However, with the above-described known technique, it is not necessarily possible to improve usability in the display device. For example, the above-described known technique only controls the display mode of the foldable display device, and is not necessarily able to improve the usability in the display device.

In view of this, the present disclosure proposes an information processing apparatus, an information processing method, and an information processing program capable of improving usability in a display device.

Solution to Problem

To solve the above problem, a information processing apparatus comprising:
 a detection unit that detects a stretching operation on a display device having flexibility so as to be able to be stretched from a state of being wound in a tubular shape; and
 a display control unit that displays a plurality of pieces of content in parallel in a stretching region stretched by the stretching operation, in accordance with a mode of the stretching operation detected by the detection unit.

BRIEF DESCRIPTION OF DRAWINGS

FIG. 3 is a view illustrating a three-dimensional view of a terminal device according to an embodiment of the present disclosure.

FIG. 8 is a diagram illustrating an example of information processing according to an embodiment of the present disclosure.

FIG. 9 is a diagram illustrating an example of information processing according to an embodiment of the present disclosure.

FIG. 10 is a diagram illustrating an example of information processing according to an embodiment of the present disclosure.

FIG. 11 is a diagram illustrating an example of information processing according to an embodiment of the present disclosure.

FIG. 17 is a diagram illustrating an example of information processing according to an embodiment of the present disclosure.

DESCRIPTION OF EMBODIMENTS

Embodiments of the present disclosure will be described below in detail with reference to the drawings. In each of the following embodiments, the same parts are denoted by the same reference symbols, and a repetitive description thereof will be omitted.

The present disclosure will be described in the following order.

Figure 1:
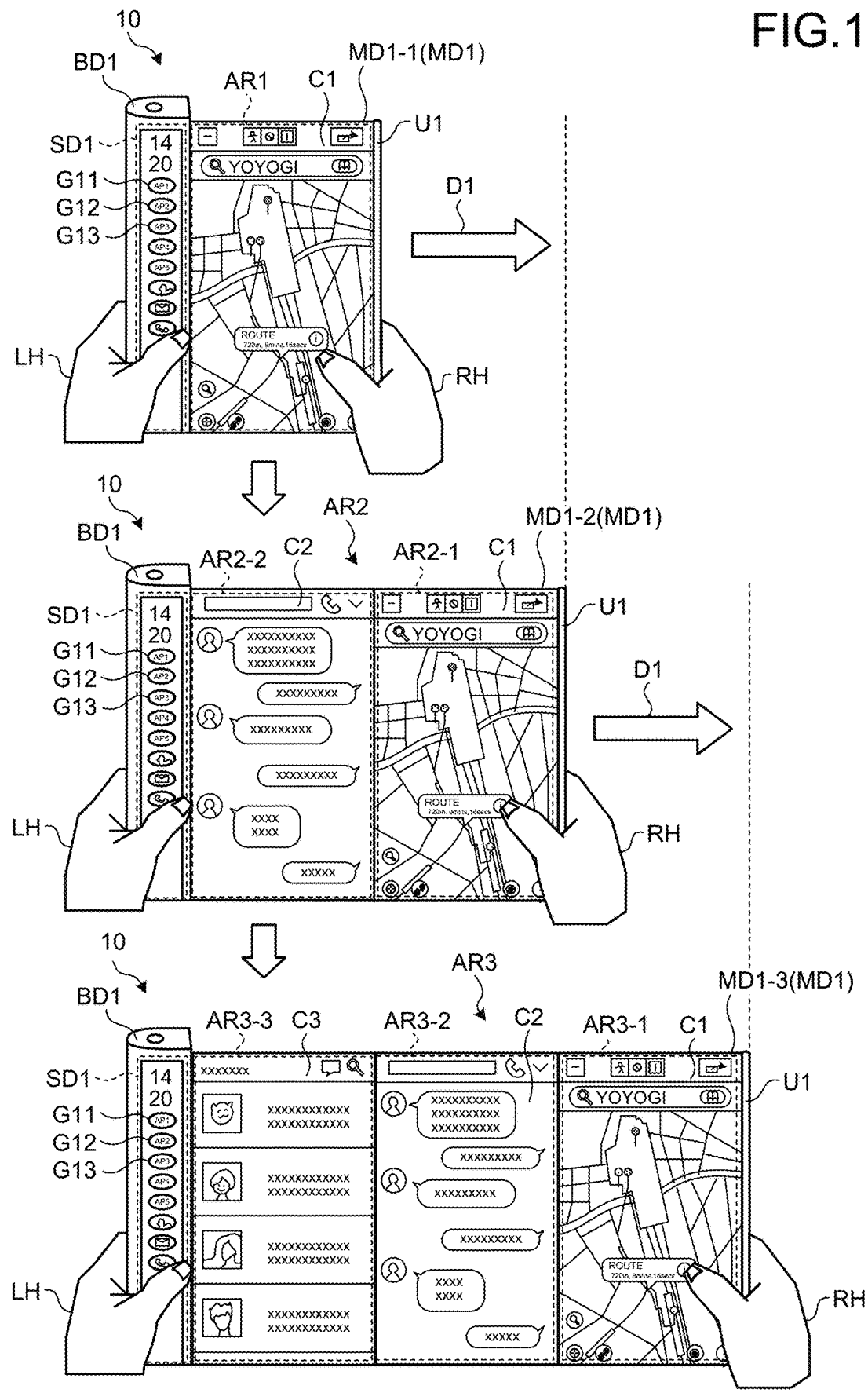
FIG. 1 is a diagram illustrating an example of information processing according to an embodiment of the present disclosure.

1. Embodiments
   1-1. Overview of information processing according to embodiment of present disclosure
   1-2. Structure of terminal device according to embodiment
   1-3. Configuration of terminal device according to embodiment
   1-4. Procedure of information processing according to embodiment
   1-4-1. Procedure of detection process according to embodiment
   1-4-2. Procedure of display control process according to embodiment
   1-5. Other information processing according to embodiment of present disclosure
   1-5-1. Other information processing (1) according to embodiment
   1-5-2. Other information processing (2) according to embodiment
   1-5-3. Other information processing (3) according to embodiment
   1-5-4. Other information processing (4) according to embodiment
   1-5-5. Other information processing (5) according to embodiment
   1-5-6. Other information processing (6) according to embodiment
   1-5-7. Other information processing (7) according to embodiment
   1-5-8. Other information processing (8) according to embodiment
   1-5-9. Other information processing (9) according to embodiment
   1-5-10. Other information processing (10) according to embodiment
   1-5-11. Other information processing (11) according to embodiment
   1-6. Modification of embodiment
   1-6-1. Modification (1) of embodiment
   1-6-2. Modification (2) of embodiment
2. Other embodiments
3. Effects related to present disclosure
4. Hardware configuration 1. Embodiments 1-1. Overview of Information Processing According to Embodiment of Present Disclosure FIG. 1 is a diagram illustrating an example of information processing according to an embodiment of the present disclosure. The information processing according to an embodiment of the present disclosure is implemented by a terminal device 10 illustrated in FIG. 1.

Figure 4:
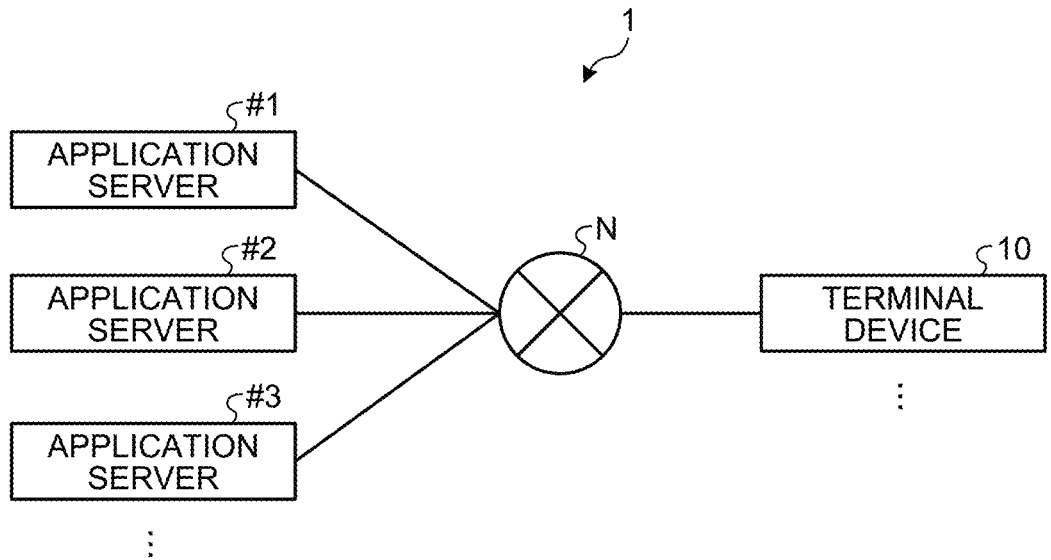
FIG. 4 is a diagram illustrating a configuration example of an information processing system according to an embodiment of the present disclosure.

Prior to the description of FIG. 1, a configuration of an information processing system according to an embodiment of the present disclosure will be described with reference to FIG. 4. FIG. 4 is a diagram illustrating a configuration example of an information processing system according to an embodiment of the present disclosure. As illustrated in FIG. 4, an information processing system 1 includes a terminal device 10, an application server #1, an application server #2, and an application server #3. The terminal device 10 is communicably connected to the application server #$^1$, the application server #2, and the application server #3 with wired or wireless connection via a predetermined network N. The information processing system 1 illustrated in FIG. 4 may include any number of terminal devices 10, any number of application servers #1, any number of application servers 12, and any number of application servers #3. Note that the information processing system 1 illustrated in FIG. 4 may include an application server that provides an arbitrary application service, not limited to the application server #1, the application server #2, and the application server #3.

The terminal device 10 is an information processing apparatus that executes information processing according to the embodiment. Specifically, the terminal device 10 detects a stretching operation on a flexible display device that can be stretched from a tubular wound state. In addition, the terminal device 10 displays a plurality of pieces of content in parallel in a stretching region obtained by the stretching operation in accordance with a mode of the detected stretching operation.

Furthermore, the terminal device 10 is an information processing apparatus used by a user. Specifically, the terminal device 10 is an information processing apparatus (mobile terminal device) that is small, lightweight and portable. In the example illustrated in FIG. 1, the terminal device 10 is an information processing apparatus including: a housing BD1 having a size of a pen (for example, about 140 mm) and a rod-like shape easily gripped with one hand; and a display device MD1 having flexibility. The display device MD1 is a flexible display device such as an organic electro-luminescence (EL) display or electronic paper display, and is housed inside the housing BD1 in a state of being wound in a tubular shape. The housing BD1 has an opening for drawing out the display device MD1 to the outside of the housing BD1.

When a user of the terminal device 10 grips the housing BD1 with a left hand LH, by performing, with a right hand RH, a stretching operation of stretching a draw-out portion U1 located at an end of the display device MD1 housed in the housing BD1 in a D1 direction being a direction away from a direction facing the opening of the housing BD1, the user can freely select the screen size of a region (hereinafter, also referred to as "stretching region") of the display device MD1 stretched by the stretching operation. Here, "stretching" refers to drawing out the display device MD1 wound in a tubular shape inside the housing BD1 toward the outside of the housing BD1. In addition, "stretching" means pulling an end of the display device MD1 in a tubular wound state to increase an area of a region that functions as a display surface. Note that the display device MD1 itself does not have elasticity and does not elastically expand or contract. That is, "stretching" does not mean elastically expanding or contracting the display device MD1 itself.

In addition, the stretching region refers to a region between the opening of the housing BD1 and the draw-out portion U1 in the display device MD1. That is, the more the draw-out portion U1 moves away from the opening of the housing BD1, the more the size of the stretching region increases. Conversely, the more the draw-out portion U1 comes closer to the opening of the housing BD1, the more the size of the stretching region decreases. Note that the user of the terminal device 10 can hold the housing BD1 with the right hand, which will be described below.

In the following description, the display devices MD1 are referred to as display devices MD1-1, MD1-2, and MD1-3 in accordance with the size of the stretching region. For example, when the screen of a smartphone has a single screen size, the display device MD1-1 is the display device MD1 having a state in which the stretching region has the single screen size. The display device MD1-2 is a display device MD1 having a state in which the stretching region has a double screen size. The display device MD1-3 is a display device MD1 having a state in which the stretching region has a triple screen size. In the following description, the display devices MD1-1, MD1-2, and MD1-3 will be referred to as the display device MD1 when described with no particular distinction.

Hereinafter, the stretching region will be described as stretching regions AR1, AR2, and AR3 depending on the size of the stretching region. For example, the stretching region AR1 indicates an entire stretching region of the display devices MD1-1. The stretching region AR2 indicates an entire stretching region of the display device MD1-2. The stretching region AR3 indicates an entire stretching region of the display device MD1-3.

Furthermore, the housing BD1 is provided with a housing display region SD1 that scrollably displays a list of images of icons (hereinafter, also referred to as "icon images") by which individual applications are identifiable. By selecting the icon image displayed in the housing display region SD1, the user of the terminal device 10 can display the content corresponding to the application identified by the selected icon image in the stretching region.

Here, a flow of information processing according to an embodiment of the present disclosure will be described with reference to FIG. 1. As illustrated in the upper part of FIG. 1, the user of the terminal device 10 performs a stretching operation to stretch the display device MD1 housed in the housing BD1 in the right direction with the right hand RH while gripping the housing BD1 with the left hand LH, and selects to set the screen size of the stretching region to the single screen size by this operation.

The terminal device 10 detects a stretching operation on the flexible display device MD1 that can be stretched from the tubular wound state. The terminal device 10 detects a stretching operation of stretching the draw-out portion U1 located at the end of the display device MD1 in the D1 direction, which is a direction away from the housing BD1. Specifically, inside the housing BD1 of the terminal device 10, there is provided a winding shaft that winds the display device MD1. The display device MD is wound around a winding shaft inside the housing BD1 to be wound into a tubular shape inside the housing BD1. The winding shaft has a ratchet mechanism including a gear and a pawl. The winding shaft rotates when the display device MD1 is stretched by a stretching operation from a state in which the display device MD1 is wound in a tubular shape. By detecting the rotation of the winding shaft, the terminal device 10 detects the stretching operation. In the example illustrated in the upper part of FIG. 1, the terminal device 10 detects a stretching operation (hereinafter, also referred to as "first stretching operation") onto the display device MD1.

Hereinafter, the (N+1) th stretching operation (N is a natural number) indicates a stretching operation performed subsequent to the Nth stretching operation. That is, the (N+1) th stretching operation indicates a stretching operation performed in a state where the display device MD1 is stretched by the Nth stretching operation (for example, the state of the display device MD1-N).

Subsequently, after having detected the stretching operation, the terminal device 10 detects the size of the stretching region stretched by the stretching operation. More specifically, when having detected the stretching operation, the terminal device 10 detects the number of gears that have passed over the pawl by the ratchet mechanism duration rotation of the winding shaft. By detecting the number of gears that have passed over the pawl by the ratchet mechanism, the terminal device 10 detects the size of the stretching region stretched by the stretching operation. In the example illustrated in the upper part of FIG. 1, when having detected the first stretching operation, the terminal device 10 detects a number GE1 of gears that have passed over the pawl by the ratchet mechanism. For example, the number of gears GE1 corresponds to the size of a display region of a single screen size. By detecting the number of gears GE1, the terminal device 10 detects that the size of the stretching region AR1 stretched by the first stretching operation is the single screen size.

The user of the terminal device 10 performs a selection operation (for example, a touch operation such as a tap operation) to select an icon image G11 indicating the application AP1 providing a service related to a map from the list of the icon images scrollably displayed in the housing display region SD1.

The terminal device 10 detects a selection operation (hereinafter, also referred to as "first selection operation") on the icon image G11 displayed in the housing display region SD1. Specifically, the terminal device 10 detects a selection operation on the icon image G11 displayed in the housing display region SD1 by a capacitive method. Note that the terminal device 10 may adopt any method such as a resistive film method, a surface acoustic wave method, an infrared method, or an electromagnetic induction method as long as the method can detect a user's selection operation and implement a touch panel function.

Hereinafter, the (N+1) th selection operation (N is a natural number) indicates a selection operation performed after the Nth selection operation. That is, the (N+1) th selection operation indicates a selection operation performed in a state where the content corresponding to the application identified by the image selected by the Nth selection operation is displayed in the stretching region.

When having detected the selection operation on the icon image G11, the terminal device 10 transmits a request for distribution of a piece of content corresponding to the application AP1 identified by the icon image G11 to an application server #1 that provides the service of the application AP1. In response to the request from the terminal device 10, the application server #1 distributes content C1 corresponding to the application AP1 to the terminal device 10. The terminal device 10 acquires the content C1 from the application server #1.

After having acquired the content C1, the terminal device 10 determines whether the acquired content C1 can be displayed in the stretching region AR1. Specifically, the terminal device 10 determines whether the size of the stretching region exceeds a predetermined threshold. When having determined that the size of the stretching region exceeds the predetermined threshold, the terminal device 10 determines that the content corresponding to the selected application can be displayed in the stretching region. In contrast, when having determined that the size of the stretching region is the predetermined threshold or less, the terminal device 10 determines that the content corresponding to the selected application cannot be displayed in the stretching region. In the example illustrated in the upper part of FIG. 1, the terminal device 10 determines that the size of the stretching region AR1 exceeds a predetermined threshold. Having determined that the size of the stretching region AR1 exceeds the predetermined threshold, the terminal device 10 determines that the acquired content C1 can be displayed in the stretching region AR1.

Subsequently, when having determined that the content C1 can be displayed in the stretching region AR1, the terminal device 10 displays the content C1 corresponding to the application AP1 in the stretching region AR1.

Next, as illustrated in the middle part of FIG. 1, the user of the terminal device 10 performs a new stretching operation of stretching the draw-out portion U1 located at the end of the display device MD1-1 illustrated in the upper part of FIG. 1 in the D1 direction being the direction away from the housing BD1, and selects to set the screen size of the stretching region to the double screen size by this operation.

The terminal device 10 detects a new stretching operation (hereinafter, also referred to as "second stretching operation") on the flexible display device MD1 that can be stretched from the tubular wound state. The terminal device 10 detects a second stretching operation of stretching the draw-out portion U1 located at the end of the display device MD1 in the D1 direction being a direction away from the housing BD1. When having detected the second stretching operation, the terminal device 10 detects that the size of the stretching region AR2-2 stretched by the second stretching operation is the single screen size. Specifically, when having detected the second stretching operation, the terminal device 10 detects a number GE2 of gears that have passed over the pawl by the ratchet mechanism by the second stretching operation. For example, the number of gears GE2 is the same as the number of gears GE1, and corresponds to the size of the display region of the single screen size. Subsequently, after having detected the number of gears GE2, the terminal device 10 adds the detected number of gears GE2 and the number of gears GE1 detected at the time of the first stretching operation, thereby detecting that the size of the stretching region AR2 after execution of the second stretching operation is the double screen size. Here, a region AR2-1 illustrated in the middle part of FIG. 1 is a region corresponding to the region AR1 illustrated in the upper part of FIG. 1. Furthermore, the stretching region AR2 is a region including a stretching region AR2-1 and a stretching region AR2-2.

The user of the terminal device 10 performs a selection operation to select an icon image G12 indicating an application AP2 providing a text chat function from the list of icon images scrollably displayed in the housing display region SD1.

The terminal device 10 detects a selection operation (hereinafter, also referred to as "second selection operation") on the icon image G12 displayed in the housing display region SD1. When having detected the selection operation on the icon image G12, the terminal device 10 transmits a request for distribution of a piece of content corresponding to the application AP2 identified by the icon image G12 to an application server #2 that provides the service of the application AP2. In response to the request from the terminal device 10, the application server #2 distributes content C2 corresponding to the application AP2 to the terminal device 10. The terminal device 10 acquires the content C2 from the application server #2.

After having acquired the content C2, the terminal device 10 determines whether the acquired content C2 can be displayed in the stretching region AR2. Specifically, the terminal device 10 determines whether the size of the stretching region AR2 exceeds a predetermined threshold. In the example illustrated in the middle part of FIG. 1, the terminal device 10 determines that the size of the stretching region AR2 exceeds the predetermined threshold. Having determined that the size of the stretching region AR2 exceeds the predetermined threshold, the terminal device 10 determines that the acquired content C2 can be displayed in the stretching region AR2.

Subsequently, when determining that the content C2 can be displayed in the stretching region AR2, the terminal device 10 displays the acquired content C2 and the currently displayed content C1 in parallel in the stretching region AR2. In other words, the terminal device 10 displays the content C2 corresponding to the application AP2 selected by the second selection operation and the content C1 corresponding to the application AP1 selected by the first selection operation in the stretching region AR2 in parallel to each other. Here, the two regions AR2-1 and AR2-2 included in the stretching region AR2 are arranged in the order of the region AR2-2 and the region AR2-1 in the D1 direction from the housing BD1 side. Specifically, the terminal device 10 displays the content C2 corresponding to the application AP2 selected by the second selection operation in the region AR2-2 close to the housing in the stretching region AR2. In other words, the terminal device 10 displays the content C2 corresponding to the application AP2 selected by the second selection operation in the region AR2-2 being a first region from the housing BD1 side in the stretching region AR2. In addition, the terminal device 10 displays the content C1 corresponding to the application AP1 selected by the first selection operation in the region AR2-1 being a second region from the housing BD1 side in the stretching region AR2.

Next, as illustrated in the lower part of FIG. 1, the user of the terminal device 10 performs a stretching operation to stretch the display device MD1-2 illustrated in the middle part of FIG. 1 in the right direction with the right hand RH, and selects to set the screen size of the stretching region to the triple screen size.

The terminal device 10 detects a new stretching operation (hereinafter, also referred to as "third stretching operation") on the flexible display device MD1 that can be stretched from the tubular wound state. The terminal device 10 detects a third stretching operation of stretching the draw-out portion U1 located at the end of the display device MD1 in the D1 direction being a direction away from the housing BD1. When having detected the third stretching operation, the terminal device 10 detects that the size of the stretching region AR3-3 stretched by the third stretching operation is the single screen size. Specifically, the terminal device 10 detects a number GE3 of gears that have passed over the pawl by the ratchet mechanism by the third stretching operation. For example, the number of gears GE3 is the same as the number of gears GE1, and corresponds to the size of the display region of the single screen size. Subsequently, after having detected the number of gears GE3, the terminal device 10 adds the detected number of gears GE3, the number of gears GE2 detected at the time of the second stretching operation, and the number of gears GE1 detected at the time of the first stretching operation, thereby detecting that the size of the stretching region AR3 after execution of the third stretching operation is the triple screen size. Here, a region AR3-1 illustrated in the lower part of FIG. 1 is a region corresponding to the region AR2-1 illustrated in the middle part of FIG. 1. In addition, a region AR3-2 illustrated in the lower part of FIG. 1 is a region corresponding to the region AR2-2 illustrated in the middle part of FIG. 1. Furthermore, the stretching region AR3 is a region including a stretching region AR3-1, a stretching region AR3-2, and a stretching region AR3-3.

The user of the terminal device 10 performs a selection operation to select an icon image G13 indicating an application AP3 that provides a social networking service (SNS) from the list of icon images scrollably displayed in the housing display region SD1.

The terminal device 10 detects a selection operation (hereinafter, also referred to as "third selection operation") on the icon image G13 displayed in the housing display region SD1. When having detected the selection operation on the icon image G13, the terminal device 10 transmits a request for distribution of a piece of content corresponding to the application AP3 identified by the icon image G13 to an application server #3 that provides the service of the application AP3. In response to the request from the terminal device 10, the application server #3 distributes content C3 corresponding to the application AP3 to the terminal device 10. The terminal device 10 acquires the content C3 from the application server #3.

After having acquired the content C3, the terminal device 10 determines whether the acquired content C3 can be displayed in the stretching region AR3. Specifically, the terminal device 10 determines whether the size of the stretching region AR3 exceeds a predetermined threshold. In the example illustrated in the lower part of FIG. 1, the terminal device 10 determines that the size of the stretching region AR3 exceeds the predetermined threshold. Having determined that the size of the stretching region AR3 exceeds the predetermined threshold, the terminal device 10 determines that the acquired content C3 can be displayed in the stretching region AR3.

Subsequently, after having determined that the content C3 can be displayed in the stretching region AR3, the terminal device 10 displays the acquired content C3, the currently displayed content C2, and the currently displayed content C1 in parallel to each other in the stretching region AR3. In other words, the terminal device 10 displays the content C3 corresponding to the application AP3 selected by the third selection operation, the content C2 corresponding to the application AP2 selected by the second selection operation, and the content C1 corresponding to the application AP1 selected by the first selection operation in the stretching region AR3 in parallel to each other. Here, the three regions AR3-1, AR3-2, and AR3-3 included in the stretching region AR3 are arranged in the order of the regions AR3-3, AR3-2, and AR3-1 in the D1 direction from the housing BD1 side.

Specifically, the terminal device 10 displays the content C3 corresponding to the application AP3 selected by the third selection operation in the region AR3-3 close to the housing in the stretching region AR3. In other words, the terminal device 10 displays the content C3 corresponding to the application AP3 selected by the third selection operation in the region AR3-3 being a first region from the housing BD1 side in the stretching region AR3. In addition, the terminal device 10 displays the content C2 corresponding to the application AP2 selected by the second selection operation in the region AR3-2 being a second region from the housing BD1 side in the stretching region AR3. In addition, the terminal device 10 displays the content C1 corresponding to the application AP1 selected by the first selection operation in the region AR3-1 being a third region from the housing BD1 side in the stretching region AR3.

As described above, the terminal device 10 detects the stretching operation on the flexible display device that can be stretched from the tubular wound state. In addition, the terminal device 10 displays a plurality of pieces of content in parallel in a stretching region obtained by the stretching operation in accordance with a mode of the detected stretching operation. With this technique, the terminal device 10 enables the user to operate a plurality of applications simultaneously in parallel while referring to pieces of content corresponding to the plurality of applications. For example, the user of the terminal device 10 can start a map application AP1, and then the user can start an application AP2 that provides a text chat function and talk about a place for a drinking party with an acquaintance while searching for candidate places for the drinking party (for example, Yoyogi). Furthermore, for example, the user of the terminal device 10 can further start the application AP3 that provides an SNS, search for information regarding high-rated restaurants near the candidate place of the drinking party (for example, Yoyogi) from posted information on the SNS, and the user can exchange the information regarding candidate restaurants for the drinking party with the acquaintance by using the application AP2 that provides the text chat function. Accordingly, the terminal device 10 can improve usability in the display device.

1-2. Structure of Terminal Device According to Embodiment

Figure 2:
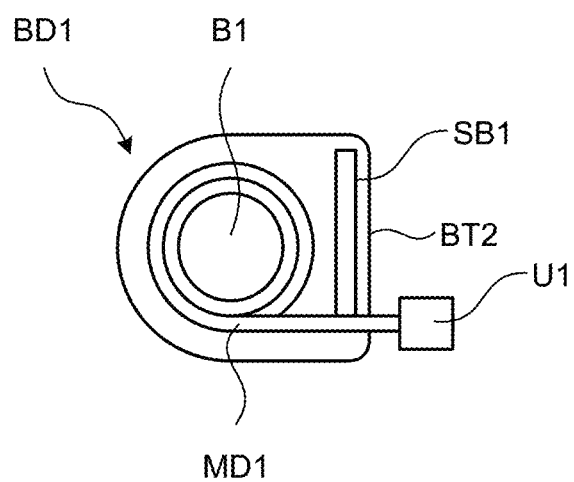
FIG. 2 is a diagram illustrating a plan view of a terminal device according to an embodiment of the present disclosure.

Next, a structure of the terminal device according to the embodiment will be described with reference to FIGS. 2 and 3.

First, a structure of a terminal device according to an embodiment of the present disclosure will be described with reference to FIG. 2. FIG. 2 is a diagram illustrating a plan view of a terminal device according to an embodiment of the present disclosure. Specifically, FIG. 2 illustrates a plan view of the housing BD1 of the terminal device 10 as viewed from directly above in the longitudinal direction of the housing BD1. Inside the housing BD1 of the terminal device 10, there is provided a winding shaft B1 that winds the flexible display device MD1. Specifically, one end of the display device MD is bonded to the winding shaft B1. Being wound around the winding shaft B1 inside the housing BD1, the display device MD is housed in the housing BD1 in a state of being wound in a tubular shape. In addition, the draw-out portion U1 is bonded to the other end of the display device MD. The user of the terminal device 10 can easily draw out the display device MD housed inside the housing BD1 by pulling the draw-out portion U1.

The winding shaft B1 has a ratchet mechanism including a gear and a pawl. The winding shaft B1 rotates when the display device MD1 is stretched by a stretching operation from a state in which the display device MD1 is wound in a tubular shape. By detecting the rotation of the winding shaft, the terminal device 10 detects the stretching operation.

When the winding shaft B1 rotates, the gear passes over the pawl by the ratchet mechanism. Specifically, the number of gears that have passed over the pawl is proportional to the size of the stretching region. By detecting the number of gears that have passed over the pawl by the ratchet mechanism, the terminal device 10 detects the size of the stretching region stretched by the stretching operation. The terminal device 10 may adopt any method as long as the method can detect the size of the stretching region stretched by the stretching operation.

In addition, the winding shaft B1 has a function as a battery of the terminal device 10.

Furthermore, inside the housing BD1 of the terminal device 10, there is provided a circuit substrate SB1. For example, the circuit substrate SB1 is a single-layer substrate (single-sided substrate). The circuit substrate SB1 may be a two-layer substrate (double-sided substrate) or the like.

In addition, a power button BT2 having a fingerprint authentication function is located in a central portion of a side surface of the housing BD1. The power button BT2 having the fingerprint authentication function is located at a position of the thumb when the user grips the power button BT2 with one hand on the side surface of the housing BD1, making it possible for the user to grip the housing BD1 with either the right hand or the left hand regardless of which is the user's dominant hand. Specifically, the power button BT2 is located in a region within a predetermined range from the center position of the side surface of the housing BD1. Furthermore, the power button BT2 may be located at a plurality of positions on the side surface of the housing BD1. For example, the power button BT2 is located at two positions on both ends of the housing BD1, and in a region within 25% of the length of the housing BD1 in the longitudinal direction from the upper end or the lower end of the housing BD1. Alternatively, the power button BT2 may be located on an entire side surface of the housing BD1.

Next, a structure of a terminal device according to an embodiment of the present disclosure will be described with reference to FIG. 3. FIG. 3 is a view illustrating a three-dimensional view of a terminal device according to an embodiment of the present disclosure. First, the upper part of FIG. 3 is a three-dimensional view of the housing BD1 of the terminal device 10. In the upper part of FIG. 3, the entire display device MD1 wound in a tubular state is housed inside the housing BD1. The housing BD1 has a housing display region SD1. The housing display region SD1 includes a display region R1 that displays a clock, and a display region R2 that scrollably displays a list of icon images by which individual applications are identifiable and which are used for displaying pieces of content corresponding to the applications in the stretching region. In the example illustrated in FIG. 2, the display region R2 scrollably displays content in which a list of icon images by which a plurality of applications is identifiable, such as an icon image G11 by which an application AP1 is identifiable, an icon image G12 by which an application AP2 is identifiable, an icon image G13 by which an application AP3 is identifiable, an icon image G14 by which an application AP4 is identifiable, and icon images G15 by which an application AP5 is identifiable.

Although the example illustrated in FIG. 1 has been described as a case where the user of the terminal device 10 holds the housing BD1 with the left hand, the user of the terminal device 10 can hold the housing BD1 with the right hand. When the user of the terminal device 10 holds the housing BD1 with the right hand RH, the user can perform a stretching operation of stretching the display device MD1 housed in the housing BD1 in the left direction with the left hand LH, making it possible to freely select the screen size of the stretching region in the display device MD1.

In addition, a screen storage button BT1 is located at an upper part of the housing BD1. The screen storage button BT1 may be located at the lower part of the housing BD1 or may be located at both the upper part and the lower part. The user of the terminal device 10 can house the stretching region in the housing BD1 at once by pressing the screen storage button BT1.

In addition, a power button BT2 having a fingerprint authentication function is located in a central portion of a side surface of the housing BD1. The power button BT2 having the fingerprint authentication function is located at a position of the thumb when the user grips the power button BT2 with one hand on the side surface of the housing BD1, making it possible for the user to grip the housing BD1 with either the right hand or the left hand regardless of which is the user's dominant hand.

The lower part of FIG. 3 illustrates a state in which a part of the display device MD1 is drawn out from the inside of the housing BD1 of the terminal device 10. Specifically, by pulling the draw-out portion U1 bonded to one end of the display device MD, the user of the terminal device 10 can draw out the display device MD housed inside the housing BD1 to the outside of the housing BD1. By performing a stretching operation to stretch the draw-out portion U1 located at the end of the display device MD1 in the D1 direction being a direction away from the housing BD1, the user of the terminal device 10 can draw out the display device MD housed inside the housing BD1 to the outside of the housing BD1.

In addition, by performing the stretching operation of further stretching the draw-out portion U1 located at the end of the display device MD1 in the D1 direction being a direction away from the housing BD1 in a state where a part of the display device MD is drawn out to the outside of the housing BD1, the user of the terminal device 10 can increase the size of the stretching region to be larger than that before the stretching operation.

In addition, by performing the winding operation of further winding the draw-out portion U1 located at the end of the display device MD1 in a D2 direction being a direction to approach the opening of the housing BD1 in a state where a part of the display device MD is drawn out to the outside of the housing BD1, the user of the terminal device 10 can decrease the size of the stretching region to be smaller than that before the stretching operation. Note that the D2 direction indicates a direction opposite to the D1 direction. By performing a winding operation instead of pressing the screen storage button BT1, the user of the terminal device 10 can gradually house the display device MD outside the housing BD1 into the housing BD1.

1-3. Configuration of Terminal Device According to Embodiment

Figure 5:
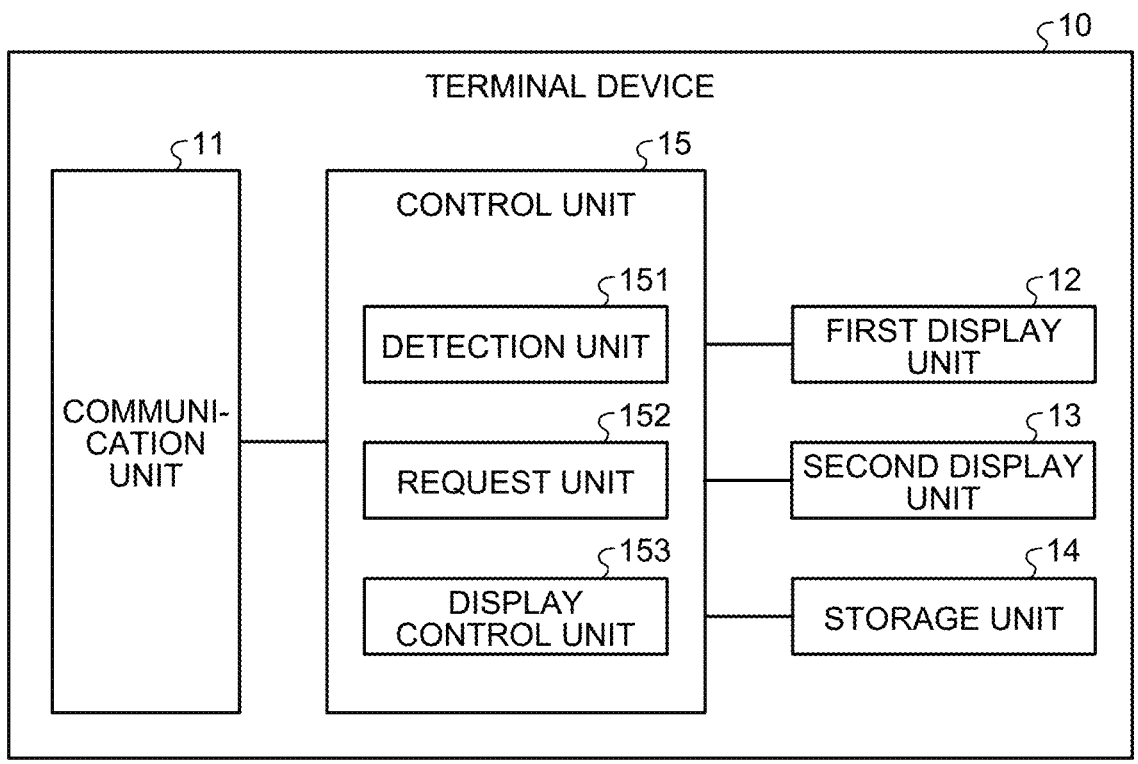
FIG. 5 is a diagram illustrating a configuration example of a terminal device according to an embodiment of the present disclosure.

Next, a configuration of the terminal device according to the embodiment will be described with reference to FIG. 5. FIG. 5 is a diagram illustrating a configuration example of the terminal device according to an embodiment of the present disclosure.

As illustrated in FIG. 5, the terminal device 10 includes a communication unit 11, a first display unit 12, a second display unit 13, a storage unit 14, and a control unit 15.

The communication unit 11 is actualized by a network interface card (NIC), for example. Then, the communication unit 11 is connected to the network N with a wired or wireless connection, and exchanges information with an external information processing apparatus such as an application server.

The first display unit 12 is a display device for displaying various types of information. The first display unit 12 corresponds to the display device MD1 of the terminal device 10. Specifically, first display unit 12 displays a plurality of pieces of content in parallel in the stretching region stretched by the stretching operation by the user. For example, the first display unit 12 is implemented by a flexible display device such as an organic electro-luminescence (EL) display, a liquid crystal display, or electronic paper.

The first display unit 12 is an input device that receives various operations from the user. Specifically, the first display unit 12 receives a stretching operation by the user. In addition, the first display unit 12 receives various operations from the user via a display surface by the touch panel function.

The second display unit 13 is a display device for displaying various types of information. The second display unit 13 corresponds to the housing display region SD1 located in the housing BD1 of the terminal device 10. Specifically, the second display unit 13 displays an image by which the application is identifiable and which is to be used for displaying content corresponding to the application in the stretching region. In addition, the second display unit 13 scrollably displays the content including a display of a list of a plurality of images by which a plurality of applications is individually identifiable. For example, the second display unit 13 is actualized by a liquid crystal display or the like. The second display unit 13 may be configured using a part of the first display unit 12. For example, the second display unit 13 may be actualized by a region having a size corresponding to the housing display region SD1 and close to the opening of the housing BD1 in the stretching region of the first display unit 12.

The second display unit 13 is an input device that receives various operations from the user. Specifically, the second display unit 13 receives a selection operation on an icon image by which an application is identifiable and being provided for displaying content corresponding to the application in the stretching region. In addition, the second display unit 13 receives a scroll operation on the content that displays a list of a plurality of images by which a plurality of applications is individually identifiable. For example, the second display unit 13 receives various operations from the user via the display surface by the touch panel function.

The storage unit 14 is implemented by semiconductor memory elements such as random access memory (RAM) and a flash drive referred to as flash memory, or other storage devices such as a hard disk or an optical disc. For example, the storage unit 14 stores an information processing program according to the embodiment. Furthermore, the storage unit 14 stores content acquired from an external information processing apparatus such as an application server.

The control unit 15 is actualized by execution of various programs (corresponding to an example of an information processing program) stored in a storage device inside the terminal device 10 by a central processing unit (CPU), a micro processing unit (MPU), or the like, using the RAM as a work area. For example, the various programs correspond to an application program referred to as a web browser. Furthermore, the control unit 15 is actualized by, for example, an integrated circuit such as an application specific integrated circuit (ASIC) or a field programmable gate array (FPGA).

As illustrated in FIG. 5, the control unit 15 includes a detection unit 151, a request unit 152, and a display control unit 153, and implements or executes a function and an action of information processing described below. The internal configuration of the control unit 15 is not limited to the configuration illustrated in FIG. 5, and may be another configuration as long as it is a configuration that performs information processing described below.

The detection unit 151 detects various types of information. The detection unit 151 detects a stretching operation on a flexible display device that can be stretched from a tubular wound state. The detection unit 151 detects a stretching operation of stretching the display device in a direction away from the housing. Specifically, the detection unit 151 detects the rotation of the winding shaft that winds up the flexible display device capable of being stretched from the state of being wound in the tubular shape. More specifically, the detection unit 151 detects the rotation of the winding shaft having a ratchet mechanism including a gear and a pawl. For example, the detection unit 151 detects the rotation of the winding shaft including the ratchet mechanism by using an optical rotation detection sensor. Subsequently, when having detected the rotation of the winding shaft, the detection unit 151 determines that the stretching operation has been detected.

In the example illustrated in FIG. 1, the detection unit 151 detects a stretching operation on the flexible display device MD1 that can be stretched from a state of being wound in a tubular shape. The detection unit 151 detects a stretching operation of stretching the draw-out portion U1 located at the end of the display device MD1 in the D1 direction, which is a direction away from the housing BD1.

Furthermore, the detection unit 151 detects the size of the stretching region that changes in accordance with the stretching operation. Specifically, when the winding shaft rotates by the stretching operation, the detection unit 151 detects the number of gears that have passed over the pawl by the ratchet mechanism. Subsequently, when having detected the number of gears, the detection unit 151 calculates the size of the stretching region corresponding to the detected number of gears. Next, after calculating the size of the stretching region, the detection unit 151 detects the calculated size of the stretching region.

In the example illustrated in the upper part of FIG. 1, when having detected the first stretching operation, the detection unit 151 detects the number GE1 of gears that have passed over the pawl by the ratchet mechanism. For example, the number of gears GE1 corresponds to the size of a display region of a single screen size. By detecting the number of gears GE1, the detection unit 151 detects that the size of the stretching region AR1 stretched by the first stretching operation is the single screen size.

Furthermore, the detection unit 151 detects a selection operation on an image displayed in the housing display region. The detection unit 151 detects a selection operation on an image by which an application is identifiable and which is provided for displaying content corresponding to the application in the stretching region. Specifically, the detection unit 151 detects a selection operation on the image received by the second display unit 13. For example, the detection unit 151 detects a selection operation on an image displayed in the housing display region by a capacitive method. Note that the detection unit 151 may detect selection operations by using any method such as a resistive film method, a surface acoustic wave method, an infrared method, or an electromagnetic induction method as long as the method can detect user's selection operations and implement touch panel functions. The detection unit 151 detects, for example, various touch operations such as a tap operation and a flick operation on an image as a selection operation.

In the example illustrated in the upper part of FIG. 1, the detection unit 151 detects a selection operation on the icon image G11 displayed in the housing display region SD1. Specifically, the detection unit 151 detects a selection operation on the icon image G11 displayed in the housing display region SD1 by the capacitive method.

In addition, the detection unit 151 detects a scroll operation on an image displayed in the housing display region. The detection unit 151 detects a scroll operation on the content that displays a list of a plurality of images by which a plurality of applications is individually identifiable. Specifically, the detection unit 151 detects the scroll operation received by the second display unit 13. For example, the detection unit 151 detects a scroll operation by the capacitive method.

In addition, the detection unit 151 detects a physical state of the terminal device 10. The detection unit 151 detects the orientation of the terminal device 10. Specifically, the detection unit 151 detects the orientation of the housing. The detection unit 151 detects the orientation of the display device. More specifically, the detection unit 151 detects the orientation of the housing and the orientation of the display device by detecting whether the longitudinal direction of the housing is a direction perpendicular to the ground or whether the longitudinal direction of the housing is a direction horizontal to the ground. For example, the detection unit 151 detects the orientation of the housing by a gyro sensor that measures the inclination of the terminal device 10 in three axis directions. The sensor used by the detection unit 151 is not limited to the gyro sensor. For example, the detection unit 151 detects the orientation of the terminal device 10 by an arbitrary sensor such as an acceleration sensor.

Furthermore, the detection unit 151 detects a change in the orientation of the terminal device 10. Specifically, the detection unit 151 detects a change in orientation of the housing. In addition, the detection unit 151 detects the change in the orientation of the display device. For example, the detection unit 151 detects a change from a state in which the longitudinal direction of the housing is perpendicular to the ground to a state in which the longitudinal direction of the housing is horizontal to the ground. Alternatively, the detection unit 151 detects a change from a state in which the longitudinal direction of the housing is horizontal to the ground to a state in which the longitudinal direction of the housing is perpendicular to the ground. For example, the detection unit 151 detects a change in the orientation of the housing by a gyro sensor that measures the inclination of the terminal device 10 in three axis directions. The sensor used by the detection unit 151 is not limited to the gyro sensor. The detection unit 151 detects the change in the orientation of the housing by an arbitrary sensor such as an acceleration sensor, for example.

The request unit 152 requests an external information processing apparatus such as an application server to distribute content. Specifically, when a selection operation on the image displayed in the housing display region is detected by the detection unit 151, the request unit 152 transmits a distribution request for a piece of content corresponding to the application identified by the image selected by the detected selection operation, to the application server that provides the service of the application. In addition, the request unit 152 acquires, from the application server, the content corresponding to the application identified by the image selected by the selection operation detected by the detection unit 151.

In the example illustrated in the upper part of FIG. 1, when having detected the selection operation on the icon image G11, the request unit 152 transmits a distribution request for a piece of content corresponding to the application AP1 identified by the icon image G11, to the application server #1 that provides the service of the application AP1. In response to the request from the terminal device 10, the application server #1 distributes content C1 corresponding to the application AP1 to the terminal device 10. The request unit 152 acquires the content C1 from the application server #1.

The display control unit 153 displays an image by which an application is identifiable and which is provided for displaying the content corresponding to the application in the stretching region in a housing display region located in a housing that houses the display device. Specifically, the display control unit 153 scrollably displays, in the housing display region, content including a display of a list of a plurality of images by which a plurality of applications is individually identifiable.

In the example illustrated in FIG. 1, the display control unit 153 displays, in the housing display region SD1, an icon image G11 by which the application AP1 is identifiable and which is provided for displaying the content corresponding to the application AP1 in the stretching region. In addition, the display control unit 153 displays, in the housing display region SD1, an icon image G12 by which the application AP2 is identifiable and which is provided for displaying the content corresponding to the application AP2 in the stretching region. Furthermore, the display control unit 153 displays, in the housing display region SD1, an icon image G13 by which the application AP3 is identifiable and which is provided for displaying the content corresponding to the application AP3 in the stretching region.

In addition, in the example illustrated in FIG. 3, the display control unit 153 scrollably displays, in the housing display region SD1, content that displays a list of icon images by which a plurality of applications is identifiable, such as the icon image G11, the icon image G12, the icon image G13, and so on. When the scroll operation on the housing display region SD1 is detected by the detection unit 151, the display control unit 153 displays, in the housing display region SD1, an icon image corresponding to an application that has not been displayed so far in the housing display region SD1. For example, when the scroll operation on the display region R2 is detected by the detection unit 151, the display control unit 153 displays, in the display region R2, an icon image corresponding to an application that has not been displayed so far in the display region R2. In addition, when the selection operation for the icon image newly displayed in the display region R2 is detected by the detection unit 151, the display control unit 153 displays an application identified by the selected icon image in the stretching region.

In addition, the display control unit 153 displays, in the stretching region, the content corresponding to the application identified by the image selected by the selection operation detected by the detection unit 151. Specifically, when the request unit 152 has acquired the first content corresponding to the first application identified by the first image selected by the first selection operation detected by the detection unit 151, the display control unit 153 determines whether the acquired first content can be displayed in the stretching region. More specifically, the display control unit 153 determines whether the size of the stretching region exceeds a predetermined threshold. Subsequently, when having determined that the size of the stretching region exceeds the predetermined threshold, the display control unit 153 determines that the acquired first content can be displayed in the stretching region. Subsequently, when having determined that the acquired first content can be displayed in the stretching region, the display control unit 153 displays the acquired first content in the stretching region.

In the example illustrated in the upper part of FIG. 1, when the request unit 152 has acquired the content C1 corresponding to the application AP1 identified by the image G11 selected by the first selection operation detected by the detection unit 151, the display control unit 153 determines whether the acquired content C1 can be displayed in the stretching region AR1. Specifically, the display control unit 153 determines whether the size of the stretching region AR1 exceeds a predetermined threshold. Subsequently, having determined that the size of the stretching region AR1 exceeds the predetermined threshold, the display control unit 153 determines that the acquired content C1 can be displayed in the stretching region AR1. Subsequently, when having determined that the content C1 can be displayed in the stretching region AR1, the display control unit 153 displays, in the stretching region AR1, the content C1 corresponding to the application AP1 identified by the selected image G11.

In addition, the display control unit 153 displays the plurality of pieces of content in parallel in the stretching region stretched by the stretching operation in accordance with the mode of the stretching operation detected by the detection unit 151. Specifically, the display control unit 153 displays the plurality of pieces of content in parallel in the stretching region in accordance with the size of the stretching region detected by the detection unit 151. In addition, the display control unit 153 displays the content corresponding to the application identified by the image selected by the selection operation detected by the detection unit 151, in a region close to the housing in the stretching region.

Specifically, when the request unit 152 has acquired the second content corresponding to the second application identified by the second image selected by the second selection operation detected by the detection unit 151, the display control unit 153 determines whether the acquired second content can be displayed in the stretching region. For example, the display control unit 153 determines whether the size of the stretching region exceeds a predetermined threshold. Here, the second selection operation is a selection operation performed after the first selection operation. That is, the second selection operation is a selection operation performed in a state where the first content corresponding to the first application identified by the first image selected by the first selection operation is displayed in the stretching region.

Subsequently, when having determined that the size of the stretching region exceeds the predetermined threshold, the display control unit 153 determines that the acquired second content can be displayed in the stretching region. Subsequently, when having determined that the acquired second content can be displayed in the stretching region, the display control unit 153 displays the acquired second content and the currently displayed first content in parallel to each other in the stretching region. In other words, the display control unit 153 displays, in parallel in the stretching region, the second content corresponding to the application AP2 selected by the second selection operation and the first content corresponding to the application AP1 selected by the first selection operation. Specifically, the display control unit 153 displays the acquired second content in a region close to the housing in the stretching region. In addition, the display control unit 153 displays the currently displayed first content in a region other than the region close to the housing in the stretching region.

In the example illustrated in the middle part of FIG. 1, when the request unit 152 has acquired the content C2 corresponding to the application AP2 identified by the icon image G12 selected by the second selection operation detected by the detection unit 151, the display control unit 153 determines whether the acquired content C2 can be displayed in the stretching region AR2. Specifically, the display control unit 153 determines whether the size of the stretching region AR2 exceeds a predetermined threshold. The display control unit 153 determines that the size of the stretching region AR2 exceeds the predetermined threshold. Subsequently, having determined that the size of the stretching region AR2 exceeds the predetermined threshold, the display control unit 153 determines that the acquired content C2 can be displayed in the stretching region AR2.

Subsequently, when determining that the content C2 can be displayed in the stretching region AR2, the display control unit 153 displays the acquired content C2 and the currently displayed content C1 in parallel to each other in the stretching region AR2. In other words, the display control unit 153 displays the content C2 corresponding to the application AP2 selected by the second selection operation and the content C1 corresponding to the application AP1 selected by the first selection operation in the stretching region AR2 in parallel to each other. Specifically, the display control unit 153 displays the content C2 corresponding to the application AP2 selected by the second selection operation in a region AR2-2 close to the housing in the stretching region AR2. In other words, the terminal device 10 displays the content C2 corresponding to the application AP2 selected by the second selection operation in the region AR2-2 being a first region from the housing BD1 side in the stretching region AR2. In addition, the display control unit 153 displays the content C1 corresponding to the application AP1 selected by the first selection operation in a region AR2-1 being a second region from the housing BD1 side in the stretching region AR2.

In the example illustrated in the lower part of FIG. 1, when the request unit 152 has acquired the content C3 corresponding to the application AP3 identified by the icon image G13 selected by the third selection operation detected by the detection unit 151, the display control unit 153 determines whether the acquired content C3 can be displayed in the stretching region AR3. Specifically, the display control unit 153 determines whether the size of the stretching region AR3 exceeds a predetermined threshold. The display control unit 153 determines that the size of the stretching region AR3 exceeds the predetermined threshold. Having determined that the size of the stretching region AR3 exceeds the predetermined threshold, the display control unit 153 determines that the acquired content C3 can be displayed in the stretching region AR3.

Subsequently, after having determined that the content C3 can be displayed in the stretching region AR3, the display control unit 153 displays the acquired content C3, the currently displayed content C2, and the currently displayed content C1 in parallel to each other in the stretching region AR3. In other words, the display control unit 153 displays the content C3 corresponding to the application AP3 selected by the third selection operation, the content C2 corresponding to the application AP2 selected by the second selection operation, and the content C1 corresponding to the application AP1 selected by the first selection operation in the stretching region AR3 in parallel to each other. Specifically, the display control unit 153 displays the content C3 corresponding to the application AP3 selected by the third selection operation in a region AR3-3 close to the housing in the stretching region AR3. In other words, the terminal device 10 displays the content C3 corresponding to the application AP3 selected by the third selection operation in the region AR3-3 being a first region from the housing BD1 side in the stretching region AR3. In addition, the display control unit 153 displays the content C2 corresponding to the application AP2 selected by the second selection operation in a region AR3-2 being a second region from the housing BD1 side in the stretching region AR3. In addition, the display control unit 153 displays the content C1 corresponding to the application AP1 selected by the first selection operation in a region AR3-1 being a third region from the housing BD1 side in the stretching region AR3.

In addition, the display control unit 153 controls the orientation of the screen. Specifically, when the detection unit 151 has detected the orientation of the housing, the display control unit 153 controls the orientation of the image displayed in the housing display region in accordance with the detected orientation of the housing. The display control unit 153 controls the orientation of the icon image displayed in the housing display region in accordance with the orientation of the housing detected by the detection unit 151. For example, when the detection unit 151 has detected that the longitudinal direction of the housing is perpendicular to the ground, the display control unit 153 displays the icon images displayed in the housing display region such that the list of the icon images is displayed to be vertically arranged in the longitudinal direction of the housing. Alternatively, when the detection unit 151 has detected that the longitudinal direction of the housing is horizontal to the ground, the display control unit 153 displays the icon images displayed in the housing display region such that the list of the icon images is displayed to be laterally arranged in the longitudinal direction of the housing.

In addition, when the orientation of the housing has been detected by the detection unit 151, the display control unit 153 controls the orientation of the content displayed in the stretching region in accordance with the detected orientation of the housing. For example, when the detection unit 151 has detected that the longitudinal direction of the housing is perpendicular to the ground, the display control unit 153 performs display such that the orientation of the plurality of pieces of content displayed in the stretching region is displayed to be laterally arranged in the longitudinal direction of the stretching region. Alternatively, when the detection unit 151 detects that the longitudinal direction of the housing is horizontal to the ground, the display control unit 153 performs display such that the orientation of the plurality of pieces of content displayed in the stretching region is displayed to be vertically arranged in the longitudinal direction of the stretching region.

In addition, when a change in the orientation of the housing has been detected by the detection unit 151, the display control unit 153 controls the orientation of the image displayed in the housing display region in accordance with the detected change in the orientation of the housing. When the detection unit 151 has detected a change from a state in which the longitudinal direction of the housing is perpendicular to the ground to a state in which the longitudinal direction of the housing is horizontal to the ground, the display control unit 153 rotates the orientation of the icon image displayed in the housing display region such that a list of the icon images is displayed to be laterally arranged in the longitudinal direction of the housing. Alternatively, when the detection unit 151 has detected that the state in which the longitudinal direction of the housing is horizontal to the ground has changed to the state in which the longitudinal direction of the housing is perpendicular to the ground, the display control unit 153 rotates the orientation of the icon image displayed in the housing display region such that a list of the icon images is displayed to be vertically arranged in the longitudinal direction of the housing.

In addition, when a change in the orientation of the housing is detected by the detection unit 151, the display control unit 153 controls the orientation of the content displayed in the stretching region in accordance with the detected change in the orientation of the housing. In addition, when the detection unit 151 detects that the state in which the longitudinal direction of the housing is perpendicular to the ground has changed to the state in which the longitudinal direction of the housing is horizontal to the ground, the display control unit 153 rotates the direction such that the direction of the content displayed in the stretching region is displayed to be laterally arranged in the longitudinal direction of the stretching region. Alternatively, when the detection unit 151 has detected a change from a state in which the longitudinal direction of the housing is horizontal to the ground to a state in which the longitudinal direction of the housing is perpendicular to the ground, the display control unit 153 rotates so that the direction of the content displayed in the stretching region is displayed to be vertically arranged in the longitudinal direction of the stretching region.

1-4. Procedure of Information Processing According to Embodiment

Next, various types of information processing procedures according to an embodiment will be described with reference to FIGS. 6 and 7.

[1-4-1. Procedure of Detection Process According to Embodiment]

First, a flow of information processing according to an embodiment of the present disclosure will be described with reference to FIG. 6. FIG. 6 is a flowchart illustrating a procedure of information processing according to the embodiment of the present disclosure. Specifically, FIG. 6 is a flowchart illustrating a procedure of a detection process according to the embodiment.

Figure 6:
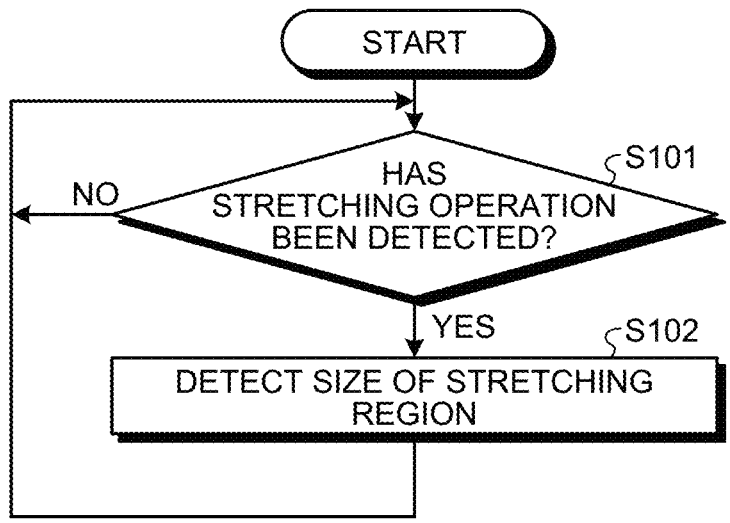
FIG. 6 is a flowchart illustrating a procedure of information processing according to an embodiment.

As illustrated in FIG. 6, the terminal device 10 determines whether a stretching operation on a flexible display device that can be stretched from a state of being wound in a tubular shape has been detected (step S101). When having determined that the stretching operation has not been detected (step S101; No), the terminal device 10 waits until the stretching operation is detected.

In contrast, when having determined that the stretching operation has been detected (step S101; Yes), the terminal device 10 detects the size of the stretching region stretched by the stretching operation (step S102). When having detected the size of the stretching region, the terminal device 10 executes step S101 again.

[1-4-2. Procedure of Display Control Process According to Embodiment]

Next, a flow of information processing according to an embodiment of the present disclosure will be described with reference to FIG. 7. FIG. 7 is a flowchart illustrating a procedure of information processing according to the embodiment of the present disclosure. Specifically, FIG. 7 is a flowchart illustrating a procedure of a display control process according to the embodiment.

Figure 7:
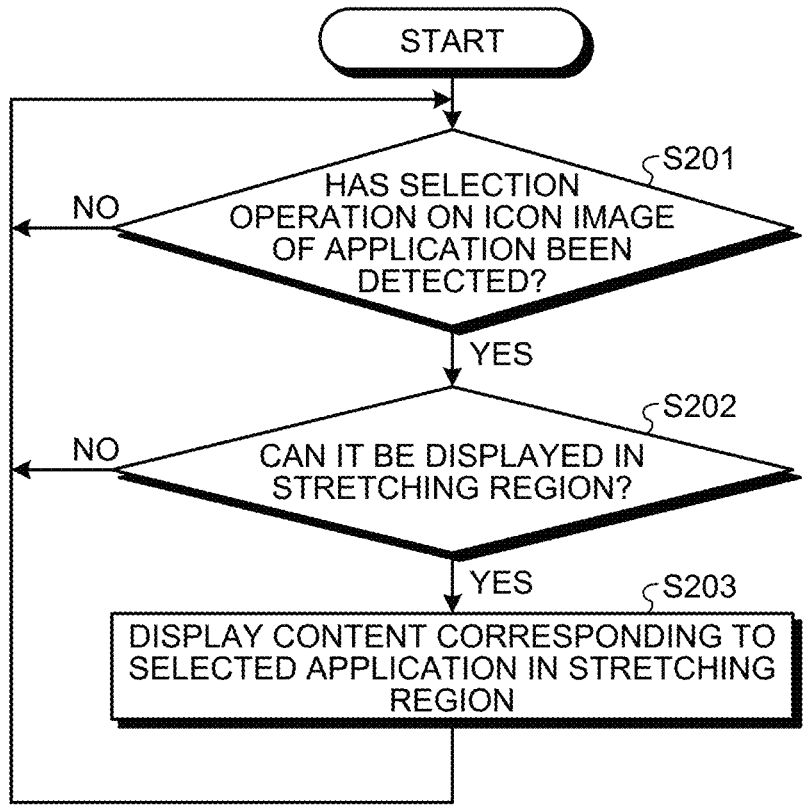
FIG. 7 is a flowchart illustrating a procedure of information processing according to an embodiment.

As illustrated in FIG. 7, the terminal device 10 determines whether it has detected a selection operation on an icon image by which an application displayed in the housing display region is identified (step S201). When having determined that the selection operation on the icon image has not been detected (step 3201; No), the terminal device 10 waits until a selection operation on the icon image is detected.

In contrast, when having determined that the selection operation on the icon image has been detected (step S201; Yes), the terminal device 10 determines whether the content corresponding to the application identified by the icon image selected by the selection operation can be displayed in the stretching region (step S202). When having determined that the content corresponding to the application identified by the selected icon image cannot be displayed in the stretching region (step S202; No), the terminal device 10 executes step S201 again.

In contrast, when having determined that the content corresponding to the application identified by the selected icon image can be displayed in the stretching region (step S202; Yes), the terminal device 10 displays, in the stretching region, the content corresponding to the application identified by the selected icon image (step S203). When having displayed the content in the stretching region, the terminal device 10 executes step S201 again.

1-5. Other Information Processing According to Embodiment of Present Disclosure Next, other information processing according to the embodiment of the present disclosure will be described with reference to FIGS. 8 to 20.

[1-5-1. Other Information Processing (1) According to Embodiment]

First, other information processing according to the embodiment of the present disclosure will be described with reference to FIG. 8. FIG. 8 is a diagram illustrating an example of information processing according to an embodiment of the present disclosure. Specifically, FIG. 8 is a diagram illustrating an example of a display control process of displaying one piece of content in the stretching region from an initial state.

FIG. 8 illustrates the display device MD1-2 in a state where the stretching region has the double screen size obtained by the stretching operation by the user. As illustrated in the upper part of FIG. 8, the display control unit 153 displays a home screen C10 in the stretching region AR2 in the initial state. For example, the display control unit 153 may display the home screen C10 that displays a list of date, clock, weather, remaining battery level, news, and the like in the stretching region AR2. Here, the initial state refers to a state in which no selection operation is performed on any application image after the stretching operation is performed on the display device MD1.

Subsequently, as illustrated in the lower part of FIG. 8, the detection unit 151 detects the first selection operation on the icon image G11 for displaying the content corresponding to the application AP1 in the stretching region AR2. Subsequently, when having acquired the content C1 corresponding to the application AP1 identified by the image G11 selected by the first selection operation detected by the detection unit 151, the display control unit 153 determines whether the acquired content C1 can be displayed in the stretching region AR2. Specifically, the display control unit 153 determines whether the size of the stretching region AR2 exceeds a predetermined threshold. Subsequently, having determined that the size of the stretching region AR2 exceeds the predetermined threshold, the display control unit 153 determines that the acquired content C1 can be displayed in the stretching region AR2. Subsequently, when determining that the content C1 can be displayed in the stretching region AR2, the display control unit 153 displays the content C1 corresponding to the application AP1 identified by the selected image G11 in a full-screen mode in the stretching region AR2.

[1-5-2. Other Information Processing (2) According to Embodiment]

Next, other information processing according to the embodiment of the present disclosure will be described with reference to FIG. 9. FIG. 9 is a diagram illustrating an example of information processing according to an embodiment of the present disclosure. Specifically, FIG. 9 is a diagram illustrating an example of a display control process of displaying one piece of content in the stretching region from an initial state.

FIG. 9 illustrates the display device MD1-2 in a state where the stretching region has the double screen size obtained by the stretching operation by the user. As illustrated in the upper part of FIG. 9, the display control unit 153 displays a home screen C10 in the stretching region AR2 in the initial state.

Subsequently, as illustrated in the lower part of FIG. 9, the detection unit 151 detects the first selection operation on the icon image G11 for displaying the content corresponding to the application AP1 in the stretching region AR2. Subsequently, when having acquired the content C1 corresponding to the application AP1 identified by the image G11 selected by the first selection operation detected by the detection unit 151, the display control unit 153 determines whether the acquired content CA can be displayed in the stretching region AR2. Specifically, the display control unit 153 determines whether the size of the stretching region AR2 exceeds a predetermined threshold. Subsequently, having determined that the size of the stretching region AR2 exceeds the predetermined threshold, the display control unit 153 determines that the acquired content C1 can be displayed in the stretching region AR2. Subsequently, when having determined that the content C1 can be displayed in the stretching region AR2, the display control unit 153 displays the content C1 corresponding to the application AP1 identified by the selected image G11 in a region AR2-2 close to the housing in the stretching region AR2, the content C1 corresponding to the application AP1 selected by the first selection operation. In other words, the terminal device 10 displays the content C1 corresponding to the application AP1 selected by the first selection operation in the region AR2-2 being a first region from the housing BD1 side in the stretching region AR2. In addition, the display control unit 153 displays a part of the home screen displayed in a full-screen mode in the region AR2-1 being a second region from the housing BD1 side in the stretching region AR2.

[1-5-3. Other Information Processing (3) According to Embodiment]

Next, other information processing according to the embodiment of the present disclosure will be described with reference to FIG. 10. FIG. 10 is a diagram illustrating an example of information processing according to an embodiment of the present disclosure. Specifically, FIG. 10 illustrates a display process of changing display positions of a plurality of pieces of content displayed in parallel in the stretching region in the stretching region.

FIG. 10 illustrates the display device MD1-2 in a state where the stretching region has the double screen size obtained by the stretching operation by the user. In the diagram illustrated in the upper part of FIG. 10, similarly to the diagram illustrated in the middle part of FIG. 1, the display control unit 153 displays content C2 corresponding to the application AP2 selected by the second selection operation in a region AR2-2 close to the housing in the stretching region AR2. In addition, the display control unit 153 displays the content C1 corresponding to the application AP1 selected by the first selection operation in a region AR2-1 being a second region from the housing BD1 side in the stretching region AR2.

Subsequently, as illustrated in the lower part of FIG. 10, the detection unit 151 detects a selection operation on an image corresponding to the content displayed in a region other than the region close to the housing, among a plurality of pieces of content displayed in parallel in the stretching region. For example, the detection unit 151 detects a selection operation on the icon image G11 corresponding to the content C1 displayed in the region AR2-1 other than the region AR2-2 close to the housing among the plurality of pieces of content displayed in parallel in the stretching region AR2. At this time, as the selection operation for changing the display position of the content, for example, it is possible to assign a specific operation such as user's double-tap operation to the icon image G11. For example, the detection unit 151 detects a double-tap operation as a selection operation on the icon image G11. Subsequently, the display control unit 153 displays, in the region close to the housing, the content corresponding to the application identified by the image selected by the selection operation detected by the detection unit 151. For example, the display control unit 153 displays, in the region AR2-2 close to the housing, the content C1 corresponding to the application AP1 identified by the icon image G11 selected by the selection operation detected by the detection unit 151. In addition, the display control unit 153 displays the content C2 corresponding to the application AP2 that has not been the selection target, in the region AR2-1 other than the region AR2-2 close to the housing.

[1-5-4. Other Information Processing (4) According to Embodiment]

Next, other information processing according to the embodiment of the present disclosure will be described with reference to FIG. 11. FIG. 11 is a diagram illustrating an example of information processing according to an embodiment of the present disclosure. Specifically, FIG. 11 is a diagram illustrating an example of a display control process in a case where the number of applications started exceeds the number of applications that can be simultaneously started.

FIG. 11 illustrates the display device MD1-2 in a state where the stretching region has the double screen size obtained by the stretching operation by the user. The diagram in the upper part of FIG. 11 illustrates a case where the number of applications that can be simultaneously started when the stretching region has the double screen size is "4". Here, four regions AR2-1, AR2-2, AR2-3, and AR2-4 included in the stretching region AR2 are arranged in the order of the regions AR2-4, AR2-3, AR2-2, and AR2-1 in the D1 direction from the housing BD1 side. Specifically, the display control unit 153 displays the content C1 corresponding to the application AP1 selected by the first selection operation in the region AR2-1 being a fourth region from the housing BD1 side in the stretching region AR2. In addition, the display control unit 153 displays the content C2 corresponding to the application AP2 selected by the second selection operation in the region AR2-2 being a third region from the housing BD1 side in the stretching region AR2. In addition, the display control unit 153 displays the content C3 corresponding to the application AP3 selected by the third selection operation in the region AR2-3 being the second region from the housing BD1 side in the stretching region AR2. In addition, the display control unit 153 displays the content C4 corresponding to the application AP4 selected by the fourth selection operation in the region AR2-4 close to the housing in the stretching region AP2. In other words, the terminal device 10 displays the content C4 corresponding to the application AP4 selected by the fourth selection operation in the region AR2-4 being a first region from the housing BD1 side in the stretching region AR2. Here, the stretching region AR2 is a region including the stretching region AR2-1, the stretching region AR2-2, the stretching region AR2-3, and the stretching region AR2-4.

Here, the (N+1) th selection operation (N is a natural number) indicates a selection operation performed after the Nth selection operation. That is, the (N+1) th selection operation indicates a selection operation performed in a state where the content corresponding to the application identified by the image selected by the Nth selection operation is displayed in the stretching region.

Subsequently, the diagram illustrated in the lower part of FIG. 11 illustrates a case where the user has started a fifth application AP5 beyond "4", which is the number of applications that can be simultaneously started in a case where the stretching region has the double screen size. Specifically, the display control unit 153 displays content C5 corresponding to the application AP5 selected by the fifth selection operation in a region AR2-4 close to the housing in the stretching region AR2. In other words, the terminal device 10 displays the content C5 corresponding to the application AP5 selected by the fifth selection operation in the region AR2-4 being the first region from the housing BD1 side in the stretching region AR2. In addition, the display control unit 153 displays the content C4 corresponding to the application AP4 selected by the fourth selection operation in the region AR2-3 being the second region from the housing BD1 side in the stretching region AR2. In addition, the display control unit 153 displays the content C3 corresponding to the application AP3 selected by the third selection operation in the region AR2-2 being a third region from the housing BD1 side in the stretching region AR2. In addition, the display control unit 153 displays the content C2 corresponding to the application AP2 selected by the second selection operation in the region AR2-1 being a fourth region from the housing BD1 side in the stretching region AR2.

[1-5-5. Other Information Processing (5) According to Embodiment]

Figure 12:
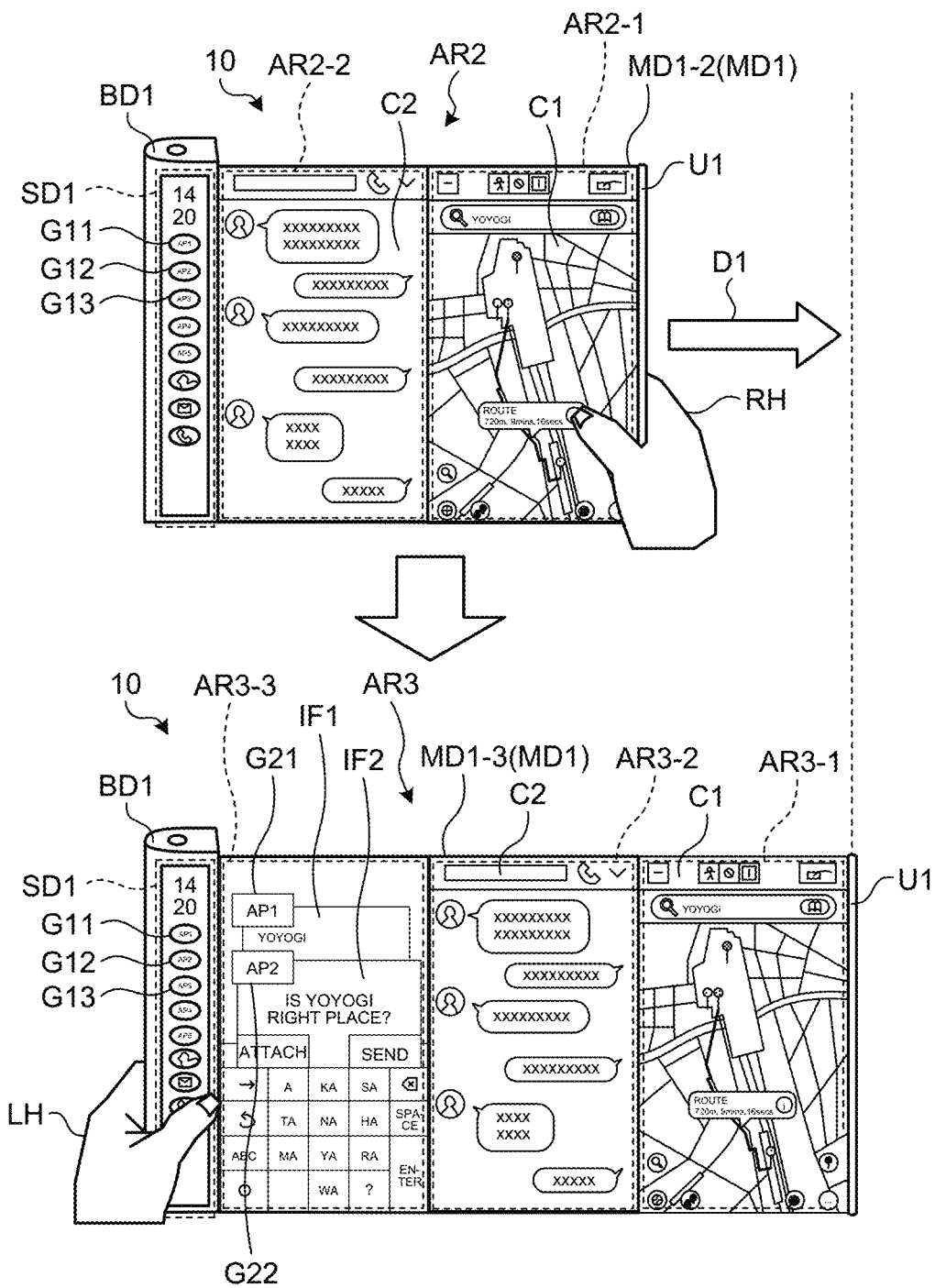
FIG. 12 is a diagram illustrating an example of information processing according to an embodiment of the present disclosure.

Next, other information processing according to the embodiment of the present disclosure will be described with reference to FIG. 12. FIG. 12 is a diagram illustrating an example of information processing according to an embodiment of the present disclosure. Specifically, FIG. 12 is a diagram illustrating an example of the display control process of displaying the input content corresponding to the process input screen for the user to input the text information in parallel with the display content on which the input text information is displayed.

In the diagram illustrated in the upper part of FIG. 12, similarly to the diagram illustrated in the middle part of FIG. 1, the display control unit 153 displays content C2 corresponding to the application AP2 selected by the second selection operation in a region AR2-2 close to the housing in the stretching region AR2. In other words, the terminal device 10 displays the content C2 corresponding to the application AP2 selected by the second selection operation in the region AR2-2 being a first region from the housing BD1 side in the stretching region AR2. In addition, the display control unit 153 displays the content C1 corresponding to the application AP1 selected by the first selection operation in a region AR2-1 being a second region from the housing BD1 side in the stretching region AR2. The user of the terminal device 10 performs a third stretching operation on the display device MD1.

Here, the (N+1) th stretching operation (N is a natural number) indicates a stretching operation performed after the Nth stretching operation. That is, the (N+1) th stretching operation indicates a stretching operation performed in a state where the display device MD1 is stretched by the Nth stretching operation (for example, the state of the display device MD1-N).

Subsequently, in the diagram illustrated in the lower part of FIG. 12, the detection unit 151 detects the third stretching operation on the display device MD1. The detection unit 151 detects a stretching operation on the display device that displays the display content including the text information input by the user in the stretching region. Specifically, the detection unit 151 detects the third stretching operation on the display device MD1 that displays the content C1 including the text information input by the user in the stretching region AR2. In addition, the detection unit 151 detects the third stretching operation on the display device MD1 that displays the content C2 including the display of the text information input by the user in the stretching region AR2.

The display control unit 153 displays, in parallel, the display content including the display of the text information input by the user and the input content corresponding to the input screen for the user to input the text information displayed on the display content. Specifically, the display control unit 153 displays the input content corresponding to the input screen for the user to input the text information displayed on the display content in a stretching region newly stretched by the stretching operation detected by the detection unit 151. Specifically, when the third stretching operation has been detected by the detection unit 151, the display control unit 153 displays input content IF1 corresponding to the input screen for the user to input the text information displayed as the content C1 in the stretching region AR3-3 newly stretched by the third stretching operation detected by the detection unit 151. In this manner, when the third stretching operation has been detected by the detection unit 151, the display control unit 153 displays, in parallel, the content C1 including the display of the text information input by the user and the input content IF1 corresponding to the input screen for the user to input the text information displayed on the content C1.

Furthermore, when the third stretching operation has been detected by the detection unit 151, the display control unit 153 displays input content IF2 corresponding to the input screen for the user to input the text information displayed on the content C2 in the stretching region AR3-3 newly stretched by the third stretching operation detected by the detection unit 151. In this manner, when the third stretching operation has been detected by the detection unit 151, the display control unit 153 displays, in parallel, the content C2 including the display of the text information input by the user and the input content IF2 corresponding to the input screen for the user to input the text information displayed on the content C2.

In addition, the display control unit 153 displays an image by which an application corresponding to the input content is identifiable so that the image is superimposed on a part of the input content. Specifically, the display control unit 153 displays an image G21 by which the application AP1 corresponding to input content IF1 is identifiable so as to be superimposed on a part of the input content IF1. In addition, the display control unit 153 displays an image G22 by which the application AP2 corresponding to the input content IF2 is identifiable so as to be superimposed on a part of the input content IF2.

At this time, the user can select to which of the application AP1 and the application AP2 the text information will be input by tapping the display area of the image G21 or the image G22. Subsequently, the input content (either of IF1 or IF2) for which the user is currently performing the input operation is displayed on the front side, and the other image is displayed on the back side as illustrated in the lower diagram of FIG. 12. Specifically, the detection unit 151 detects a selection operation on the image G22. Subsequently, when the selection operation on the image G22 is detected by the detection unit 151, the display control unit 153 displays the text information for the input content IF2 corresponding to the application AP2 identified by the selected image G22 so that the text information can be input. For example, the display control unit 153 displays the input content IF2 corresponding to the application AP2 identified by the selected image G22 on the front side, and displays the input content IF1 corresponding to the application AP1 identified by the other image G21 on the back side of the input content IF2.

Incidentally, the user can also display the input content on the screen without performing the stretching operation. For example, as illustrated in the upper part of FIG. 12, the following is a case where the user performs an operation while holding the housing BD1 with the left hand in a state where the stretching region AR2 has the double screen size, in which the content C2 is displayed in a region AR2-2 on the left side of the screen with the content C1 being displayed in a region AR2-1 on the right side of the screen. At this time, when the user's operation of tapping a text input field for the content C2 displayed in the region AR2-2 or user's touch-and-hold operation on the icon image G12 corresponding to the content C2 is detected by the detection unit 151, the display control unit 153 displays the content C2 in the region AR2-1 on the right side of the screen, hides the content C1, and further displays the input content IF2 in the region AR2-2 on the left side of the screen. Alternatively, the display control unit 153 may display, in the housing display region SD1, a dedicated icon (hereinafter, also referred to as an input-dedicated image G32) for displaying the input content IF2 in the stretching region. For example, when the selection operation for the input-dedicated image G32 displayed in the housing display region SD1 is detected by the detection unit 151, the display control unit 153 displays the input content IF2 in the stretching region. In this case, the display control unit 153 may display the input content IF2 in the region of the screen that displays the inactive content (for example, content that is not user's operation target) out of the content C1 and the content C2.

In addition, the display control unit 153 displays a plurality of pieces of input content. The display control unit 153 displays input content that is not a user's input operation target and input content that is a user's input operation target. For example, the display control unit 153 displays the input content IF2 being a user's input operation target so as to be superimposed on the input content IF1 that is not a user's input operation target. Note that the display control unit 153 may display the input content IF1 that is not a user's input operation target and the input content IF2 that is a user's input operation target in parallel to each other. In addition, the display control unit 153 may visually emphasize the input content IF2 being the user's input operation target as compared with the input content IF1 that is not the user's input operation target. For example, the display control unit 153 may display the input content IF2 that is the user's input operation target with luminance higher than that of the input content IF1 that is not the user's input operation target.

[1-5-6. Other Information Processing (6) According to Embodiment]

Figure 13:
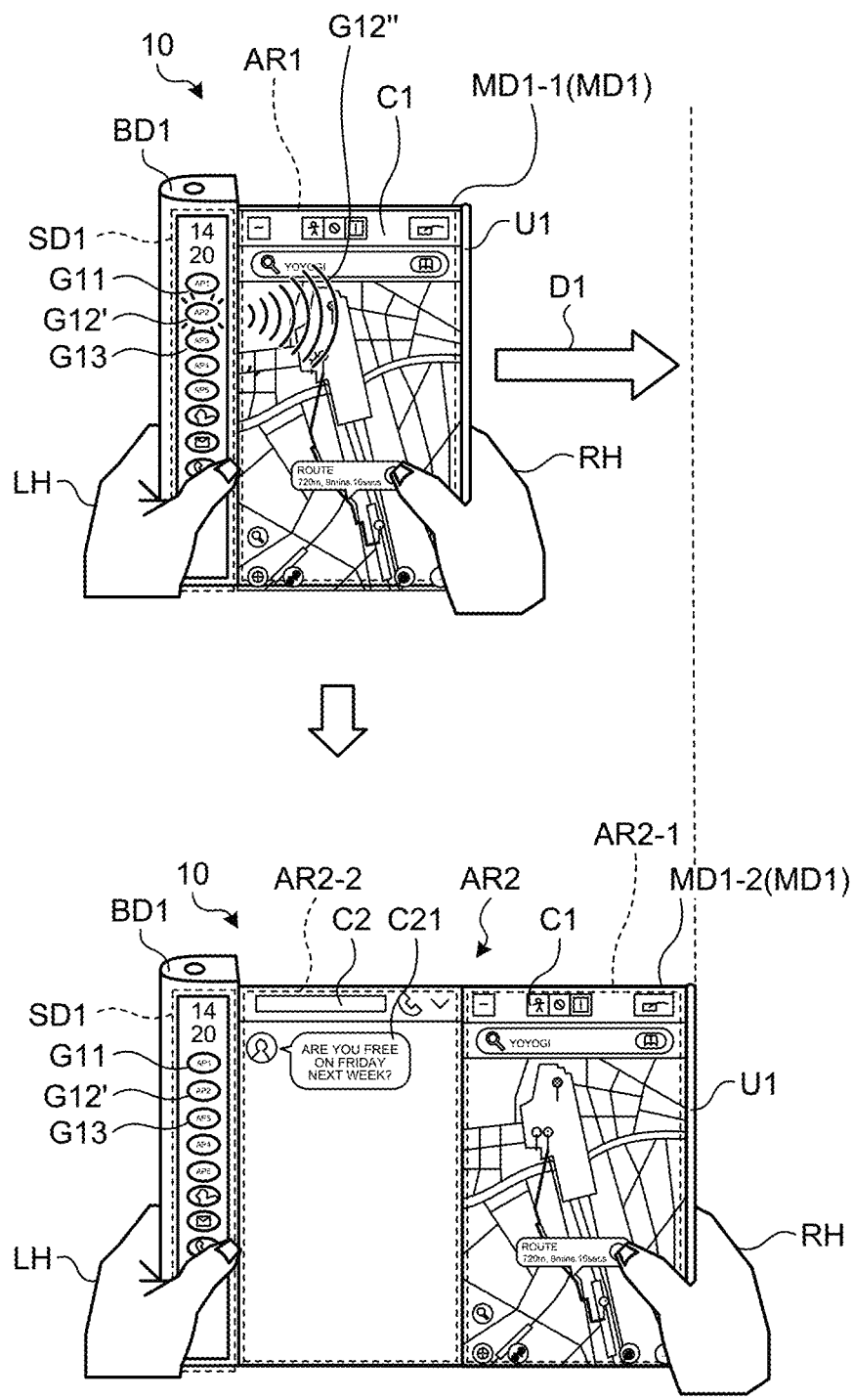
FIG. 13 is a diagram illustrating an example of information processing according to an embodiment of the present disclosure.

Next, other information processing according to the embodiment of the present disclosure will be described with reference to FIG. 13. FIG. 13 is a diagram illustrating an example of information processing according to an embodiment of the present disclosure. Specifically, FIG. 13 is a diagram illustrating an example of a display control process of displaying information indicating reception of a notification related to an application.

In the example illustrated in the upper part of FIG. 13, similarly to the example illustrated in the upper part of FIG. 1, the display control unit 153 displays the content C1 corresponding to the application AP1 selected by the first selection operation in the stretching region AR1.

Subsequently, the detection unit 151 detects reception of a notification related to an application. By changing the state of the image displayed in the housing display region, the display control unit 153 displays information indicating reception of the notification detected by the detection unit 151 in the housing display region. Specifically, by changing the state of the image by which the application being the notification target is identified, the display control unit 153 displays the information indicating the reception of the notification detected by the detection unit 151 in the housing display region. More specifically, the display control unit 153 displays the state of the image by which the notification target application is identified in a more visually emphasized manner than the image by which applications other than the notification target application are identified. For example, the display control unit 153 displays, in a blinking display, an image by which the notification target application is identified. Alternatively, the display control unit 153 displays the image by which the application as the notification target is identified with luminance higher than that of the image by which the application other than the notification target is identified. In the example illustrated in the upper part of FIG. 13, the detection unit 151 detects reception of a notification related to the application AP2. By using a blinking display for the icon image G12 displayed in the housing display region SD1, the display control unit 153 displays information indicating reception of the notification detected by the detection unit 151 in the housing display region SD1. The display control unit 153 displays an icon image G12' displayed in a blinking manner in the housing display region SD1.

Furthermore, the display control unit 153 may change the display position of the image displayed in the housing display region and may thereby display information indicating reception of the notification detected by the detection unit 151 in the housing display region. For example, as illustrated in FIG. 13, in a case where the longitudinal direction of the housing is a direction perpendicular to the ground, the display control unit 153 sets the display position of the image by which the application as the notification target is identified in the housing display region at a position above the display position of the images by which applications other than the notification target are identified. Furthermore, in a case where the longitudinal direction of the housing is a direction horizontal to the ground, the display control unit 153 sets the display position of the image by which the application as the notification target is identified in the housing display region at a position left to the display position of the images by which applications other than the notification target are identified.

In addition, the display control unit 153 displays information indicating reception of a notification in a region based on an image indicating an application corresponding to the notification detected by the detection unit 151 in the stretching region. In the example illustrated in the upper part of FIG. 13, the display control unit 153 displays information indicating reception of notification in a region based on the icon image G12 indicating the application AP2 corresponding to the notification detected by the detection unit 151 in the stretching region AR1. For example, the display control unit 153 displays an image G12″ indicating a state in which ripples spread around the icon G12 in a region based on the icon image G12 indicating the application AP2 corresponding to the notification detected by the detection unit 151 in the stretching region AR1.

In addition, the display control unit 153 displays information indicating reception of the notification detected by the detection unit 151 in the stretching region that currently displays the content corresponding to the second application different from the first application. In the example illustrated in the upper part of FIG. 13, the display control unit 153 displays information indicating reception of the notification detected by the detection unit 151 in the stretching region AR1 that displays the content C1 corresponding to the application AP1 different from the application AP2 being the notification target. For example, the display control unit 153 displays, in the superimposed manner, the image G12″ indicating a state in which ripples spread around the icon G12 indicating the application AP2 corresponding to the notification detected by the detection unit 151 in the stretching region AR1 that displays the content C1 corresponding to the application AP1.

Furthermore, after receiving the notification related to the application, the detection unit 151 detects the stretching operation on the display device. The display control unit 153 displays the content of the application corresponding to the notification in the stretching region stretched by the stretching operation detected by the detection unit 151. In the example illustrated in the lower part of FIG. 13, after receiving the notification related to the application AP2, the detection unit 151 detects the stretching operation of stretching the draw-out portion U1 located at the end of the display device MD1 in the D1 direction. The display control unit 153 displays the content C2 of the application AP2 corresponding to the notification in the stretching region AR2-2 stretched by the stretching operation detected by the detection unit 151.

In addition, the display control unit 153 displays information included in the notification in the stretching region stretched by the stretching operation detected by the detection unit 151. In the example illustrated in the lower part of FIG. 13, the display control unit 153 displays the content C21 indicating information included in the notification in the stretching region AR2-2 stretched by the stretching operation detected by the detection unit 151.

[1-5-7. Other Information Processing (7) According to Embodiment]

Figure 14:
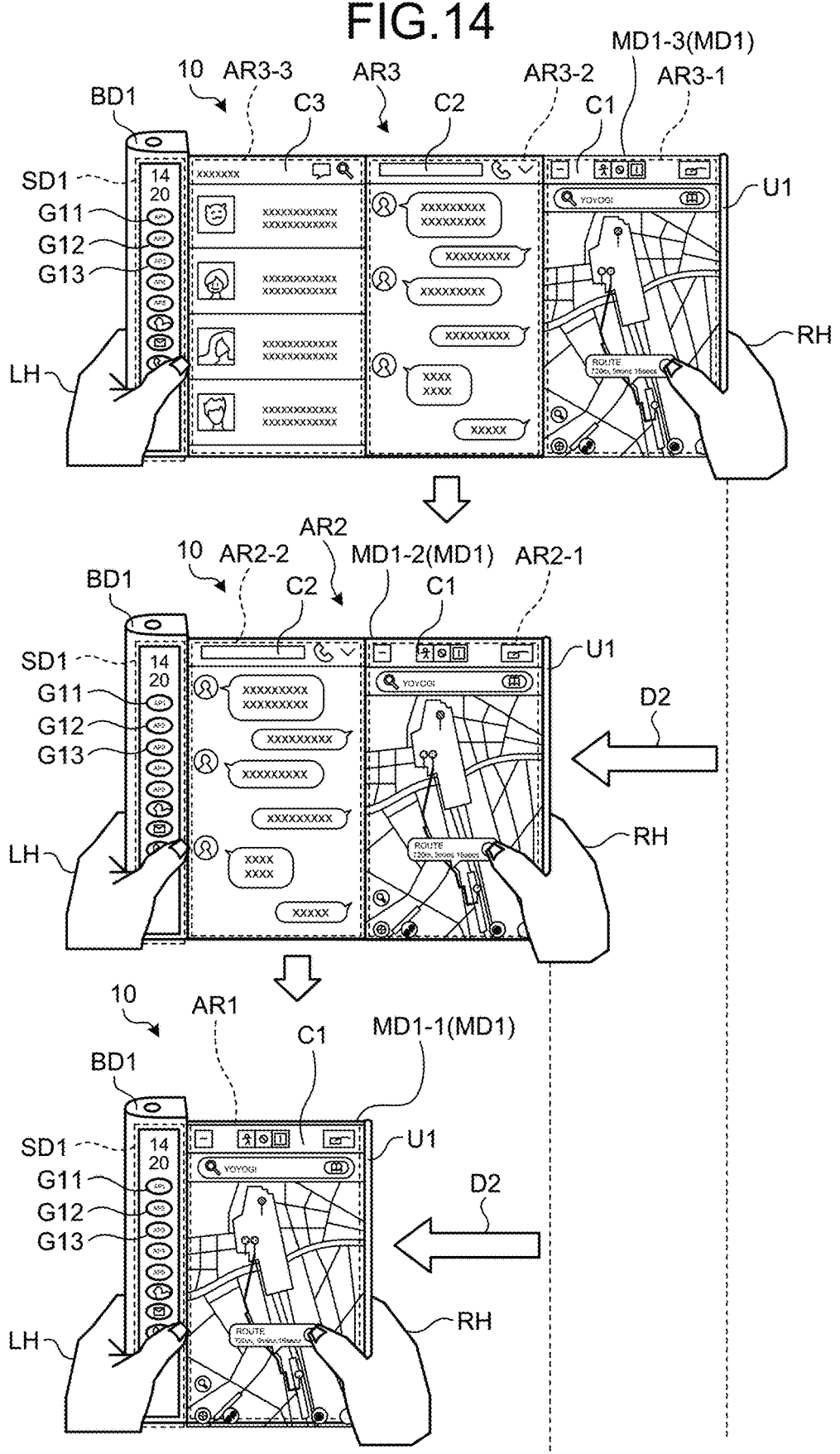
FIG. 14 is a diagram illustrating an example of information processing according to an embodiment of the present disclosure.

Next, other information processing according to the embodiment of the present disclosure will be described with reference to FIG. 14. FIG. 14 is a diagram illustrating an example of information processing according to an embodiment of the present disclosure. Specifically, FIG. 14 is a diagram illustrating an example of a content display control process when the size of the stretching region that displays a plurality of pieces of content in parallel gradually decreases.

In the diagram illustrated in the upper part of FIG. 14, similarly to the diagram illustrated in the lower part of FIG. 1, the display control unit 153 displays the content C1 corresponding to the application AP1 selected by the first selection operation in a region AR3-1 opposite to the housing in the stretching region AR3. In addition, the display control unit 153 displays the content C2 corresponding to the application AP2 selected by the second selection operation in a region AR3-2 close to the region AR3-3 close to the housing in the stretching region AP3. In addition, the display control unit 153 displays the content C3 corresponding to the application AP3 selected by the third selection operation in the region AR3-3 close to the housing in the stretching region AR3.

The user of the terminal device 10 performs the first winding operation of winding the draw-out portion U1 located at the end of the display device MD1 in a D2 direction which is a direction of approaching the opening of the housing BD1, thereby decreasing the size of the stretching region to be smaller than the size before performing the first winding operation. In the diagram illustrated in the middle part of FIG. 14, the user of the terminal device 10 performs the first winding operation to make the size of the stretching region smaller by the single screen size compared with the size before performing the first winding operation. That is, the user of the terminal device 10 decreases the size of the stretching region from the triple screen size to the double screen size.

The detection unit 151 detects a winding operation of winding the stretching region to a state of being wound in a tubular shape. The detection unit 151 detects a winding operation of winding the display device in a direction of approaching the housing. Specifically, the detection unit 151 detects the size of the winding region that changes with the winding operation.

Specifically, when the winding shaft rotates by the winding operation, the detection unit 151 detects the number of gears that have passed over the pawl by the ratchet mechanism. Subsequently, when having detected the number of gears, the detection unit 151 calculates the size of the winding region corresponding to the detected number of gears. Next, after calculating the size of the winding region, the detection unit 151 detects the calculated size of the winding region. Subsequently, the detection unit 151 may detect the size of the stretching region after the winding operation by subtracting the calculated size of the winding region from the size of the stretching region before the winding operation is performed.

In the example illustrated in FIG. 14, the detection unit 151 detects the first winding operation on the display device MD1. The detection unit 151 detects a first winding operation of winding the draw-out portion U1 located at the end of the display device MD1 in the D2 direction being a direction of approaching the opening of the housing BD1. The detection unit 151 detects the first winding operation of reducing the size of the stretching region by the single screen size. Specifically, when having detected the first winding operation, the detection unit 151 detects the number GE1' of gears that have passed over the pawl by the ratchet mechanism. For example, the number of gears GE1' corresponds to the size of a display region of the single screen size. By detecting the number of gears GE1', the detection unit 151 detects that the size of the stretching region wound by the first winding operation is the single screen size. Furthermore, the detection unit 151 detects the size of the stretching region after the first winding operation is performed. Specifically, after having detected the number of gears GE1', the detection unit 151 subtracts the detected number of gears GE1' from the number of gears that have passed over before the first winding operation is performed, thereby detecting that the size of the stretching region AR2 after execution of the first winding operation is the double screen size. In this manner, the detection unit 151 detects the first winding operation of reducing the size of the stretching region from the triple screen size to the double screen size.

In accordance with the mode of the winding operation detected by the detection unit 151, the display control unit 153 sequentially hides the plurality of pieces of content displayed in parallel in the stretching region before execution of the winding operation, from the side of the housing that houses the display device or from the opposite side of the housing that houses the display device. Specifically, in accordance with the size of the stretching region after the winding operation detected by the detection unit 151, the display control unit 153 sequentially hides the plurality of pieces of content displayed in parallel in the stretching region before execution of the winding operation, from the side of the housing that houses the display device or from the opposite side of the housing that houses the display device.

In the example illustrated in FIG. 14, in accordance with the size of the stretching region after the first winding operation detected by the detection unit 151, the display control unit 153 hides the plurality of pieces of content displayed in parallel in the stretching region before execution of the first winding operation, in order from the side of the housing SD1 that houses the display device MD1. Specifically, when the first winding operation is detected by the detection unit 151, the display control unit 153 hides the content C3 displayed in the region AR3-3 close to the housing among the plurality of pieces of content displayed in the stretching region before the first winding operation is performed.

In the diagram illustrated in the middle part of FIG. 14, similarly to the diagram illustrated in the middle part of FIG. 1, the display control unit 153 displays the content C1 corresponding to the application AP1 selected by the first selection operation in a region AR2-1 opposite to the housing in the stretching region AR2. In addition, the display control unit 153 displays the content C2 corresponding to the application AP2 selected by the second selection operation in the region AR2-2 close to the housing in the stretching region AR2.

The user of the terminal device 10 performs the second winding operation of winding the draw-out portion U1 located at the end of the display device MD1 in a D2 direction being a direction of approaching the opening of the housing BD1, thereby decreasing the size of the stretching region to be smaller than the size before performing the second winding operation. In the diagram illustrated in the lower part of FIG. 14, the user of the terminal device 10 performs the second winding operation to make the size of the stretching region smaller by the single screen size compared with the size before performing the second winding operation. That is, the user of the terminal device 10 decreases the size of the stretching region from the double screen size to the single screen size.

The detection unit 151 detects a second winding operation on the display device MD1. The detection unit 151 detects the second winding operation of winding the draw-out portion U1 located at the end of the display device MD1 in the D2 direction being a direction of approaching the opening of the housing BD1. The detection unit 151 detects the second winding operation of reducing the size of the stretching region by the single screen size. Specifically, when having detected the second winding operation, the detection unit 151 detects the number GE2' of gears that have passed over the pawl by the ratchet mechanism. For example, the number of gears GE2' is the same as the number of gears GE1', and corresponds to the size of the display region of the single screen size. By detecting the number of gears GE2', the detection unit 151 detects that the size of the stretching region wound by the second winding operation is the single screen size. Furthermore, the detection unit 151 detects the size of the stretching region after the second winding operation is performed. Specifically, after having detected the number of gears GE2', the detection unit 151 subtracts the detected number of gears GE2' from the number of gears that have passed over before the second winding operation is performed, thereby detecting that the size of the stretching region AR1 after execution of the first winding operation is the single screen size. In this manner, the detection unit 151 detects the second winding operation of reducing the size of the stretching region from the double screen size to the single screen size. Alternatively, the detection unit 151 may detect the rotation speed of the gear using a rotary encoder.

Here, the (N+1) th winding operation (N is a natural number) indicates a winding operation performed after the Nth winding operation. That is, the (N+1) th winding operation indicates a winding operation performed in a state where the display device MD1 is wound by the Nth winding operation (for example, the state of the display device MD1-N).

Specifically, when the second winding operation is detected by the detection unit 151, the display control unit 153 hides the content C2 displayed in the region AR2-2 close to the housing among the plurality of pieces of content displayed in the stretching region before the second winding operation is performed.

In the diagram illustrated in the lower part of FIG. 14, similarly to the diagram illustrated in the upper part of FIG. 1, the display control unit 153 displays, in the stretching region AR1, the content C1 corresponding to the application AP1 selected by the first selection operation.

In addition, the detection unit 151 detects the size of the stretching region that changes in accordance with the winding operation of winding the stretching region in a state of being wound in a tubular shape. When the size of the stretching region detected by the detection unit 151 is a predetermined threshold or less, the display control unit 153 hides all the content displayed in the stretching region before the winding operation is performed.

[1-5-8. Other Information Processing (8) According to Embodiment]

Figure 15:
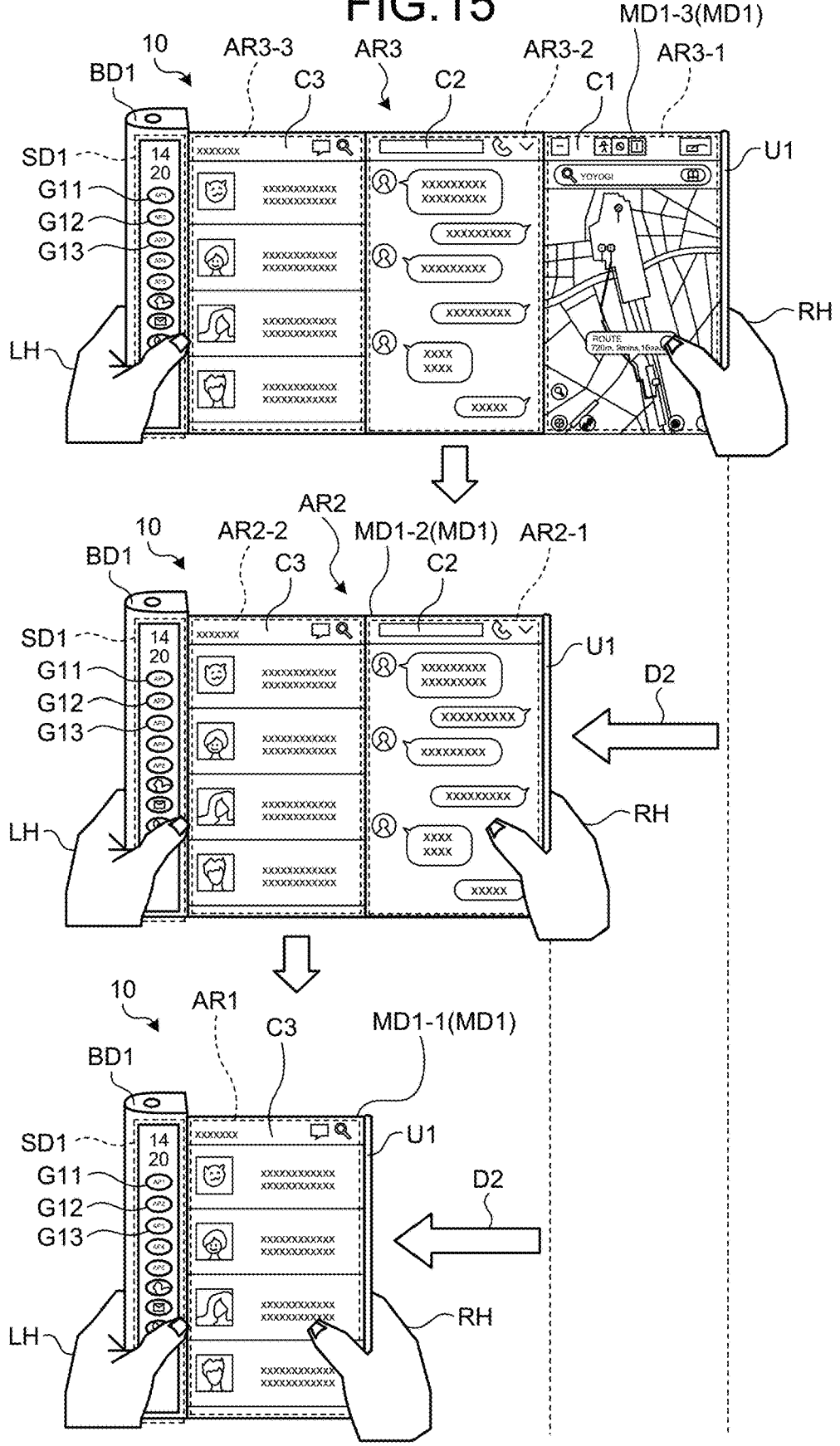
FIG. 15 is a diagram illustrating an example of information processing according to an embodiment of the present disclosure.

Next, other information processing according to the embodiment of the present disclosure will be described with reference to FIG. 15. FIG. 15 is a diagram illustrating an example of information processing according to an embodiment of the present disclosure. Specifically, FIG. 15 is a diagram illustrating an example of a content display control process when the size of the stretching region that displays a plurality of pieces of content in parallel gradually decreases.

In the diagram illustrated in the upper part of FIG. 15, similarly to the diagram illustrated in the lower part of FIG. 1, the display control unit 153 displays the content C1 corresponding to the application AP1 selected by the first selection operation in a region AR3-1 being the third region from the housing BD11 side in the stretching region AR3. In addition, the display control unit 153 displays the content C2 corresponding to the application AP2 selected by the second selection operation in a region AR3-2 being a second region from the housing BD1 side in the stretching region AR3. In addition, the display control unit 153 displays the content C3 corresponding to the application AP3 selected by the third selection operation in the region AR3-3 close to the housing in the stretching region AR3. In other words, the terminal device 10 displays the content C3 corresponding to the application AP3 selected by the third selection operation in the region AR3-3 being a first region from the housing BD1 side in the stretching region AR3.

In the diagram illustrated in the middle part of FIG. 15, the user of the terminal device 10 performs the first winding operation to make the size of the stretching region smaller by the single screen size compared with the size before performing the first winding operation. That is, the user of the terminal device 10 decreases the size of the stretching region from the triple screen size to the double screen size.

In the example illustrated in the middle part of FIG. 15, the detection unit 151 detects the first winding operation on the display device MD1. The detection unit 151 detects a first winding operation of winding the draw-out portion U1 located at the end of the display device MD1 in the D2 direction being a direction of approaching the opening of the housing BD1. The detection unit 151 detects the first winding operation of reducing the size of the stretching region by the single screen size. The detection unit 151 detects the first winding operation of reducing the size of the stretching region from the triple screen size to the double screen size.

In the example illustrated in FIG. 15, in accordance with the size of the stretching region after the first winding operation detected by the detection unit 151, the display control unit 153 hides the plurality of pieces of content displayed in parallel in the stretching region before execution of the first winding operation, in order from the side opposite to the housing SD1 that houses the display device MD1. Specifically, when the first winding operation is detected by the detection unit 151, the display control unit 153 hides the content C1 displayed in the region AR3-1 on the side opposite to the housing among the plurality of pieces of content displayed in the stretching region before the first winding operation is performed.

In the diagram illustrated in the middle part of FIG. 15, the display control unit 153 displays the content C2 corresponding to the application AP2 selected by the second selection operation in the region AR2-1 opposite to the housing in the stretching region AR2. In addition, the display control unit 153 displays the content C3 corresponding to the application AP3 selected by the third selection operation in the region AR2-2 close to the housing in the stretching region AR2.

The user of the terminal device 10 performs the second winding operation of winding the draw-out portion U1 located at the end of the display device MD1 in a D2 direction being a direction of approaching the opening of the housing BD1, thereby decreasing the size of the stretching region to be smaller than the size before performing the second winding operation. In the diagram illustrated in the lower part of FIG. 15, the user of the terminal device 10 performs the second winding operation to decrease the size of the stretching region by the single screen size compared with the size before performing the second winding operation. That is, the user of the terminal device 10 decreases the size of the stretching region from the double screen size to the single screen size.

The detection unit 151 detects a second winding operation on the display device MD1. The detection unit 151 detects the second winding operation of winding the draw-out portion U1 located at the end of the display device MD1 in the D2 direction being a direction of approaching the opening of the housing BD1. The detection unit 151 detects the second winding operation of reducing the size of the stretching region by the single screen size. The detection unit 151 detects a second winding operation of reducing the size of the stretching region from the double screen size to the single screen size.

When the second winding operation is detected by the detection unit 151, the display control unit 153 hides the content C2 displayed in the region AR2-1 on the side opposite to the housing among the plurality of pieces of content displayed in the stretching region before the second winding operation is performed.

In the diagram illustrated in the lower part of FIG. 15, the display control unit 153 displays the content C3 corresponding to the application AP3 selected by the third selection operation in the stretching region AR1.

In addition, the detection unit 151 detects the size of the stretching region that changes in accordance with the winding operation of winding the stretching region in a state of being wound in a tubular shape. When the size of the stretching region detected by the detection unit 151 is a predetermined threshold or less, the display control unit 153 hides all the content displayed in the stretching region before the winding operation is performed.

[1-5-9. Other Information Processing (9) According to Embodiment]

Figure 16:
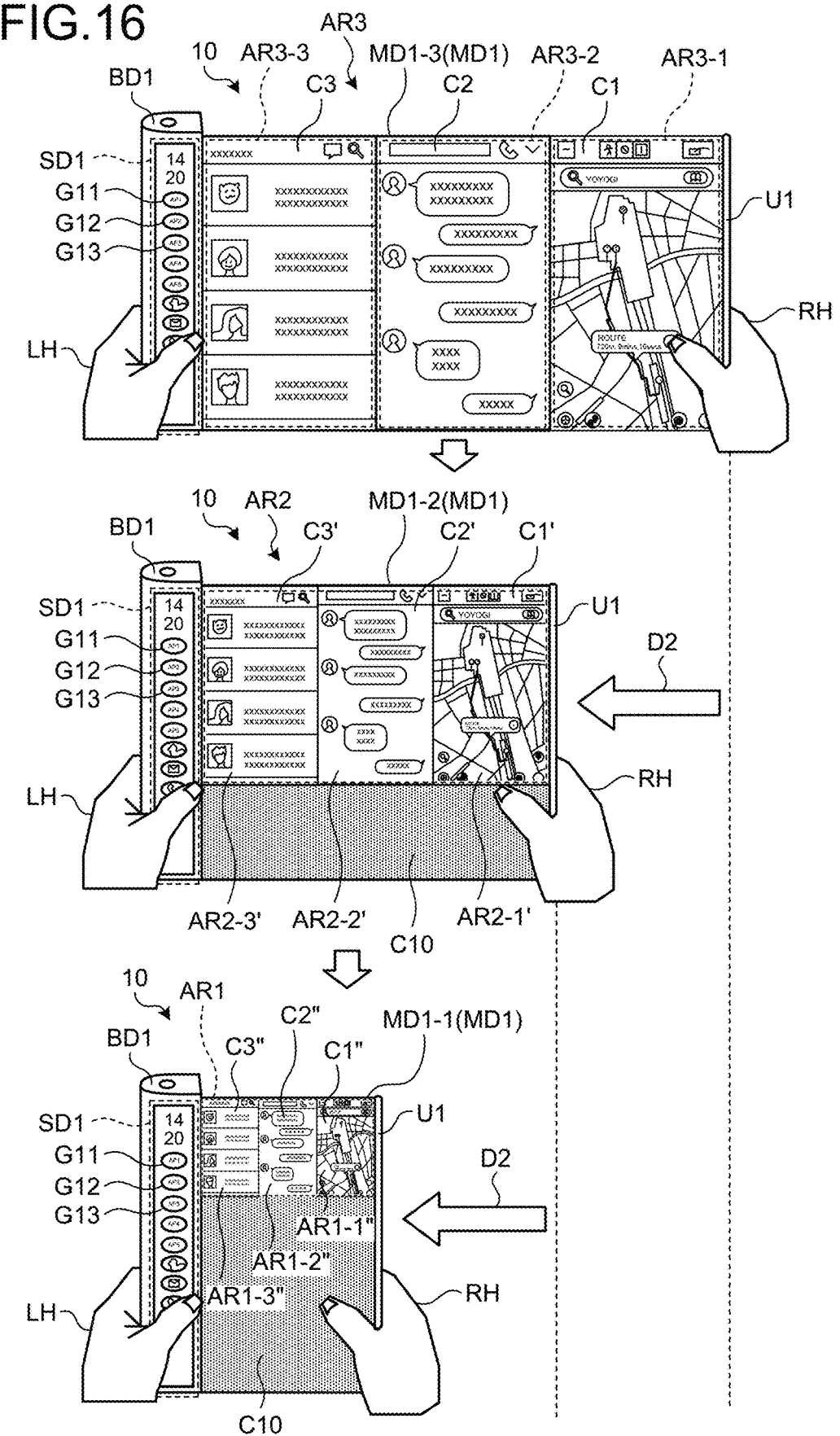
FIG. 16 is a diagram illustrating an example of information processing according to an embodiment of the present disclosure.

Next, other information processing according to the embodiment of the present disclosure will be described with reference to FIG. 16. FIG. 16 is a diagram illustrating an example of information processing according to an embodiment of the present disclosure. Specifically, FIG. 16 is a diagram illustrating an example of a content display control process when the size of the stretching region that displays a plurality of pieces of content in parallel gradually decreases.

In the diagram illustrated in the upper part of FIG. 16, similarly to the diagram illustrated in the lower part of FIG. 1, the display control unit 153 displays the content C1 corresponding to the application AP1 selected by the first selection operation in a region AR3-1 being the third region from the housing BD1 side in the stretching region AR3. In addition, the display control unit 153 displays the content C2 corresponding to the application AP2 selected by the second selection operation in a region AR3-2 being a second region from the housing BD1 side in the stretching region AR3. In addition, the display control unit 153 displays the content C3 corresponding to the application AP3 selected by the third selection operation in the region AR3-3 close to the housing in the stretching region AR3. In other words, the terminal device 10 displays the content C3 corresponding to the application AP3 selected by the third selection operation in the region AR3-3 being a first region from the housing BD1 side in the stretching region AR3.

In the diagram illustrated in the middle part of FIG. 16, the user of the terminal device 10 performs the first winding operation to decrease the size of the stretching region by the single screen size compared with the size before performing the first winding operation. That is, the user of the terminal device 10 decreases the size of the stretching region from the triple screen size to the double screen size.

In the example illustrated in the middle part of FIG. 16, the detection unit 151 detects the first winding operation on the display device MD1. The detection unit 151 detects a first winding operation of winding the draw-out portion U1 located at the end of the display device MD1 in the D2 direction being a direction of approaching the opening of the housing BD1. The detection unit 151 detects the first winding operation of reducing the size of the stretching region by the single screen size. The detection unit 151 detects the first winding operation of reducing the size of the stretching region from the triple screen size to the double screen size.

In the example illustrated in FIG. 16, in accordance with the mode of the winding operation detected by the detection unit 151, the display control unit 153 displays a plurality of pieces of content in a reduced display mode while maintaining the scale of each of pieces of content displayed in parallel in the stretching region before execution of the winding operation. Specifically, when the first winding operation is detected by the detection unit 151, the display control unit 153 displays the plurality of pieces of content in a reduced display mode while maintaining the scale of each of pieces of content displayed in the stretching region before execution of the first winding operation.

In the diagram illustrated in the middle part of FIG. 16, the display control unit 153 displays the reduced content C1' in a region AR2-1' being a third region from the housing BD1 side in the stretching region AR2 while maintaining the scale of the content C1 corresponding to the application AP1 selected by the first selection operation. In addition, the display control unit 153 displays the reduced content C2' while maintaining the scale of the content C2 corresponding to the application AP2 selected by the second selection operation in a region AR2-2' being a second region from the housing BD1 side in the stretching region AR2. In addition, the display control unit 153 displays the reduced content C3' while maintaining the scale of the content C3 corresponding to the application AP3 selected by the third selection operation in a region AR2-3' close to the housing in the stretching region AR2. In other words, the terminal device 10 displays the reduced content C3' in the region AR2-3' being a first region from the housing BD1 side in the stretching region AR2 while maintaining the scale of the content C3 corresponding to the application AP3 selected by the third selection operation.

The user of the terminal device 10 performs the second winding operation of winding the draw-out portion U1 located at the end of the display device MD1 in a D2 direction being a direction of approaching the opening of the housing BD1, thereby decreasing the size of the stretching region to be smaller than the size before performing the second winding operation. In the diagram illustrated in the lower part of FIG. 16, the user of the terminal device 10 performs the second winding operation to make the size of the stretching region smaller by the single screen size compared with the size before performing the second winding operation. That is, the user of the terminal device 10 decreases the size of the stretching region from the double screen size to the single screen size.

The detection unit 151 detects a second winding operation on the display device MD1. The detection unit 151 detects the second winding operation of winding the draw-out portion U1 located at the end of the display device MD1 in the D2 direction being a direction of approaching the opening of the housing BD1. The detection unit 151 detects the second winding operation of reducing the size of the stretching region by the single screen size. The detection unit 151 detects a second winding operation of reducing the size of the stretching region from the double screen size to the single screen size.

When the second winding operation is detected by the detection unit 151, the display control unit 153 displays the plurality of pieces of content in a reduced display mode while maintaining the scale of each of pieces of content displayed in the stretching region before execution of the second winding operation.

In the diagram illustrated in the lower part of FIG. 16, the display control unit 153 displays the reduced content C1" in a region AR1-1' being a third region from the housing BD1 side in the stretching region AR1 while maintaining the scale of the content C1' corresponding to the application AP1 selected by the first selection operation. Furthermore, the display control unit 153 displays the reduced content C2" in a region AR1-2' being a second region from the housing BD1 side in the stretching region AR1 while maintaining the scale of the content C2' corresponding to the application AP2 selected by the second selection operation. In addition, the display control unit 153 displays the reduced content C3' while maintaining the scale of the content C3' corresponding to the application AP3 selected by the third selection operation in a region AR1-3' close to the housing in the stretching region AR1. In other words, the terminal device 10 displays the reduced content C3" in the region AR1-3' being a first region from the housing BD1 side in the stretching region AR1 while maintaining the scale of the content C3' corresponding to the application AP3 selected by the third selection operation.

In addition, the detection unit 151 detects the size of the stretching region that changes in accordance with the winding operation of winding the stretching region in a state of being wound in a tubular shape. When the size of the stretching region detected by the detection unit 151 is a predetermined threshold or less, the display control unit 153 hides all the content displayed in the stretching region before the winding operation is performed.

[1-5-10. Other Information Processing (10) According to Embodiment]

Next, other information processing according to the embodiment of the present disclosure will be described with reference to FIG. 17. FIG. 17 is a diagram illustrating an example of information processing according to an embodiment of the present disclosure. Specifically, FIG. 17 is a diagram illustrating an example of a display control process of changing the arrangement order of content that has been browsed (hereinafter, also referred to as browsed content). Note that FIG. 17 simply illustrates only the stretching region of the display device MD1 in the terminal device 10.

As illustrated in the upper left part of FIG. 17, the display control unit 153 displays a list of images displayed in a reduced display mode (hereinafter, also referred to as a reduced image) obtained from the browsed content by the user in the stretching region of the display device MD1 in the browsing mode of browsing the browsing history. Specifically, when displaying the plurality of reduced images displayed in the stretching region so as to be laterally arranged in the longitudinal direction of the stretching region, the display control unit 153 displays a list of reduced images in a horizontally scrollable manner. For example, the display control unit 153 displays a reduced image corresponding to the browsed content C1, a reduced image corresponding to the browsed content C2, a reduced image corresponding to the browsed content C3, and a reduced image corresponding to the browsed content C4 to be arranged laterally in order from the housing side in the longitudinal direction of the stretching region.

Furthermore, as illustrated in the upper left part of FIG. 17, reduced images that are not displayed in the stretching region and can be displayed in the stretching region by the horizontal scroll operation are conceptually illustrated on the left and right sides of the stretching region of the display device MD1. A reduced image corresponding to the browsed content C6 is conceptually illustrated on the left side of the stretching region of the display device MD1. Furthermore, a reduced image corresponding to the browsed content C5 is conceptually illustrated on the right side of the stretching region of the display device MD1.

The detection unit 151 detects a scroll operation on the reduced image displayed in the stretching region. Specifically, the detection unit 151 detects a scroll operation received by the first display unit 12. For example, the detection unit 151 detects a scroll operation by the capacitive method. In the example illustrated in FIG. 17, the detection unit 151 detects the scroll operation of shifting the laterally arranged reduced images that can be displayed in the stretching region leftward by one reduced image (step S11). Subsequently, when the detection unit 151 has detected the scroll operation of shifting the laterally arranged reduced images that can be displayed in the stretching region to the left by one reduced image, the display control unit 153 shifts the laterally arranged reduced images displayed in the stretching region leftward by one reduced image and displays the shifted reduced images. Specifically, as illustrated in the middle of the upper part of FIG. 17, the display control unit 153 displays a reduced image corresponding to the browsed content C2, a reduced image corresponding to the browsed content C3, a reduced image corresponding to the browsed content C4, and a reduced image corresponding to the browsed content C5 to be arranged laterally in order from the housing side in the longitudinal direction of the stretching region.

Furthermore, as illustrated in the middle of the upper part of FIG. 17, a reduced image that is not displayed in the stretching region and can be displayed in the stretching region by the vertical scroll operation is conceptually illustrated above and below a region close to the housing in the stretching region of the display device MD1. As illustrated in the middle of the upper part of FIG. 17, a reduced image corresponding to the browsed content C6 and a reduced image corresponding to the browsed content C1 are vertically and conceptually illustrated on the upper side of the stretching region of the display device MD1. Furthermore, a reduced image corresponding to the browsed content C3, a reduced image corresponding to the browsed content C4, and a reduced image corresponding to the browsed content C5 are vertically and conceptually illustrated on the lower side of the stretching region of the display device MD1.

Subsequently, the detection unit 151 detects a scroll operation of shifting the vertically arranged reduced images that can be displayed in the stretching region upward by one reduced image (step S12). Subsequently, when the detection unit 151 has detected the scroll operation of shifting the vertically arranged reduced images that can be displayed in the stretching region upward by one reduced image, the display control unit 153 shifts the vertically arranged reduced images displayed in the stretching region upward by one reduced image and displays the shifted reduced images. Specifically, as illustrated in the upper right part of FIG. 17, the display control unit 153 displays a reduced image corresponding to the browsed content C3, a reduced image corresponding to the browsed content C3, a reduced image corresponding to the browsed content C4, and a reduced image corresponding to the browsed content C5 to be arranged laterally in order from the housing side in the longitudinal direction of the stretching region.

Subsequently, the detection unit 151 detects a scroll operation of shifting the laterally arranged reduced images that can be displayed in the stretching region leftward by one reduced image (step S13). Subsequently, when the detection unit 151 has detected the scroll operation of shifting the laterally arranged reduced images that can be displayed in the stretching region to the left by one reduced image, the display control unit 153 shifts the laterally arranged reduced images displayed in the stretching region leftward by one reduced image and displays the shifted reduced images. Specifically, as illustrated in the lower left part of FIG. 17, the display control unit 153 displays a reduced image corresponding to the browsed content C3, a reduced image corresponding to the browsed content C4, a reduced image corresponding to the browsed content C5, and a reduced image corresponding to the browsed content C6 to be laterally arranged in order from the housing side in the longitudinal direction of the stretching region.

Subsequently, the detection unit 151 detects a scroll operation of shifting the vertically arranged reduced images that can be displayed in the stretching region upward by two reduced images (step S14). Subsequently, when the detection unit 151 has detected the scroll operation of shifting the vertically arranged reduced images that can be displayed in the stretching region upward by two reduced images, the display control unit 153 shifts the vertically arranged reduced images displayed in the stretching region upward by two reduced images and displays the shifted reduced images. Specifically, as illustrated in the middle of the lower part of FIG. 17, the display control unit 153 displays a reduced image corresponding to the browsed content C5, a reduced image corresponding to the browsed content C4, a reduced image corresponding to the browsed content C5, and a reduced image corresponding to the browsed content C6 to be laterally arranged in order from the housing side in the longitudinal direction of the stretching region.

Subsequently, the detection unit 151 detects a scroll operation of shifting the laterally arranged reduced images that can be displayed in the stretching region rightward by two reduced images (step S15). Subsequently, when the detection unit 151 has detected the scroll operation of shifting the laterally arranged reduced images that can be displayed in the stretching region rightward by two reduced images, the display control unit 153 shifts the laterally arranged reduced images displayed in the stretching region rightward by two reduced images and displays the shifted reduced images. Specifically, as illustrated in the lower right part of FIG. 17, the display control unit 153 displays a reduced image corresponding to the browsed content C1, a reduced image corresponding to the browsed content C3, a reduced image corresponding to the browsed content C5, and a reduced image corresponding to the browsed content C4 to be laterally arranged in order from the housing side in the longitudinal direction of the stretching region.

[1-5-11. Other Information Processing (11) According to Embodiment]

Figure 18:
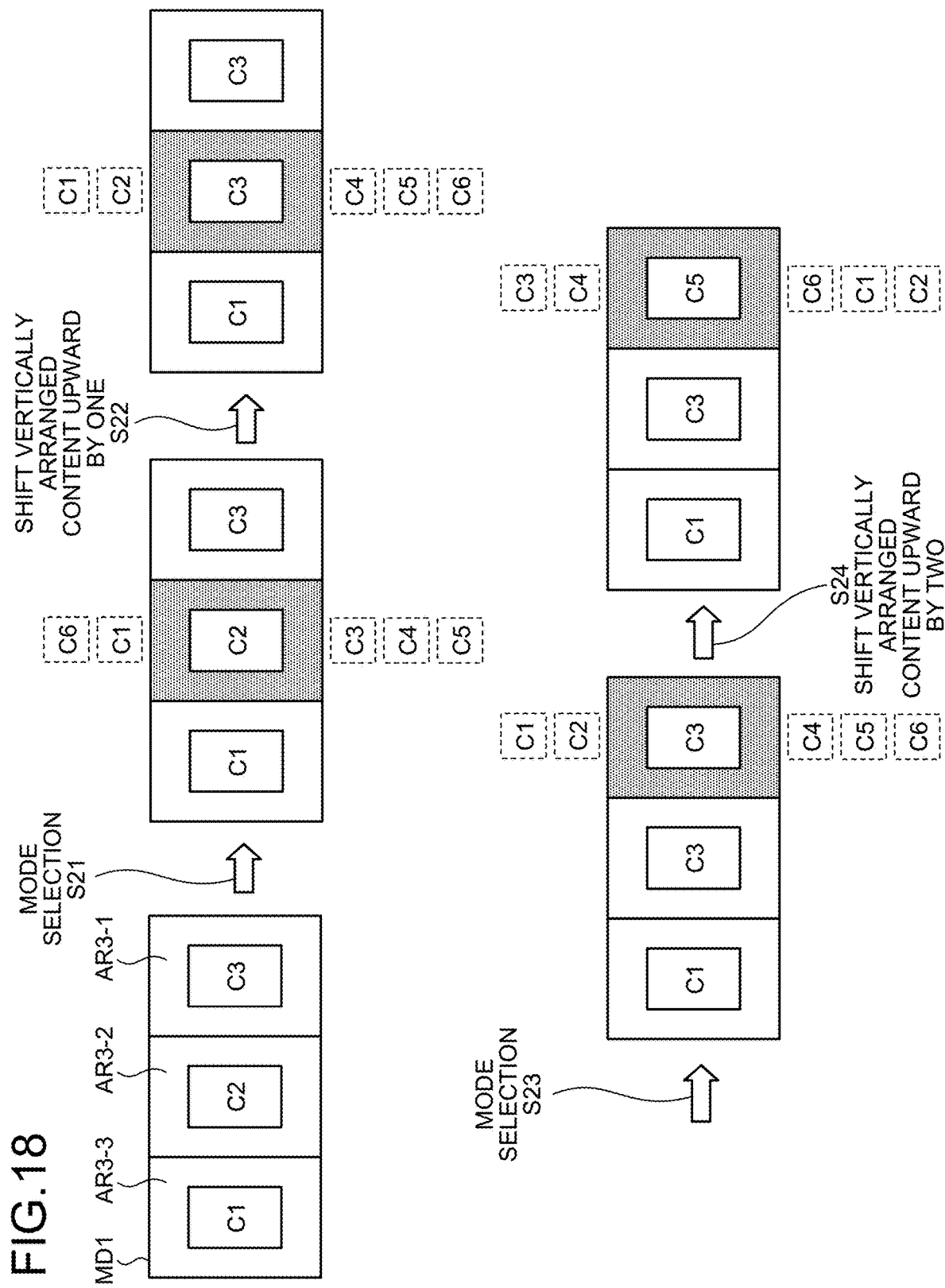
FIG. 18 is a diagram illustrating an example of information processing according to an embodiment of the present disclosure.

Next, other information processing according to the embodiment of the present disclosure will be described with reference to FIG. 18. FIG. 18 is a diagram illustrating an example of information processing according to an embodiment of the present disclosure. Specifically, FIG. 18 is a diagram illustrating an example of a display control process of changing the arrangement order of the content that has been browsed. Note that FIG. 18 simply illustrates only the stretching region of the display device MD1 in the terminal device 10.

As illustrated in the upper left part of FIG. 18, in the browsing mode of browsing the browsing history, the display control unit 153 displays a list of images displayed in a reduced display mode (hereinafter, also referred to as a reduced image) obtained from the browsed content by the user in the stretching region of the display device MD1. Specifically, when the stretching region of the display device MD1 has a triple screen size, the display control unit 153 displays a reduced image corresponding to the content C1 in a region AR3-3 close to the housing, a reduced image corresponding to the content C2 in a middle region AR3-2, and a reduced image corresponding to the content C3 in a region AR3-1 on the opposite side of the housing.

The detection unit 151 detects the selection operation in the mode of selecting the reduced image displayed in the region AR3-2 in the middle of the stretching region (step S21). For example, when detecting the touch-and-hold operation on the reduced image displayed in the region AR3-2 in the middle of the stretching region, the detection unit 151 determines that the selection operation in the mode of selecting the reduced image displayed in the region AR3-2 in the middle of the stretching region has been detected. For example, the detection unit 151 detects a touch-and-hold operation on the reduced image by the capacitive method.

Subsequently, when the detection unit 151 has detected the selection operation in the mode of selecting the reduced image displayed in the region AR3-2 in the middle of the stretching region, the display control unit 153 highlights the region other than the portion where the reduced image is displayed in the region AR3-2.

In addition, when having detected the mode selection operation, the terminal device 10 can make the reduced image displayed in the region AR3-2 selectable by the vertical scroll operation. As illustrated in the middle of the upper part of FIG. 18, a reduced image that is not displayed in the stretching region and can be displayed in the stretching region by the vertical scroll operation is conceptually illustrated above and below the region AR3-2 in the middle of the stretching region of the display device MD1. As illustrated in the middle of the upper part of FIG. 18, a reduced image corresponding to the browsed content C6 and a reduced image corresponding to the browsed content C1 are vertically and conceptually illustrated on the upper side of the region AR3-2 in the middle. Furthermore, a reduced image corresponding to the browsed content C3, a reduced image corresponding to the browsed content C4, and a reduced image corresponding to the browsed content C5 are vertically and conceptually illustrated on the lower side of region AR3-2 in the middle.

Subsequently, the detection unit 151 detects a scroll operation of shifting the vertically arranged reduced images that can be displayed in the stretching region upward by one reduced image (step S22). Subsequently, when the detection unit 151 has detected the scroll operation of shifting the vertically arranged reduced images that can be displayed in the stretching region upward by one reduced image, the display control unit 153 shifts the vertically arranged reduced images displayed in the stretching region upward by one reduced image and displays the shifted reduced images. Specifically, as illustrated in the upper right part of FIG. 18, the display control unit 153 displays a reduced image corresponding to the browsed content C3 in a region AR3-2 in the middle of the stretching region.

Subsequently, the detection unit 151 detects the selection operation of the mode for selecting the reduced image displayed in the region AR3-1 on the side opposite to the housing in the stretching region (step S23).

Subsequently, when the detection unit 151 has detected the selection operation in the mode of selecting the reduced image displayed in the region AR3-1 in the stretching region on the side opposite to the housing, the display control unit 153 highlights the region other than the portion where the reduced image is displayed in the region AR3-1.

In addition, when having detected the mode selection operation, the terminal device 10 can make the reduced image displayed in the region AR3-1 selectable by the vertical scroll operation.

Subsequently, the detection unit 151 detects a scroll operation of shifting the vertically arranged reduced images that can be displayed in the stretching region upward by two reduced images (step S24). Subsequently, when the detection unit 151 has detected the scroll operation of shifting the vertically arranged reduced images that can be displayed in the stretching region upward by two reduced images, the display control unit 153 shifts the vertically arranged reduced images displayed in the stretching region upward by two reduced images and displays the shifted reduced images. Specifically, as illustrated in the lower right part of FIG. 18, the display control unit 153 displays a reduced image corresponding to the browsed content C5 in a region AR3-1 of the stretching region on the opposite side of the housing.

1-6. Modification of Embodiment

Figure 19:
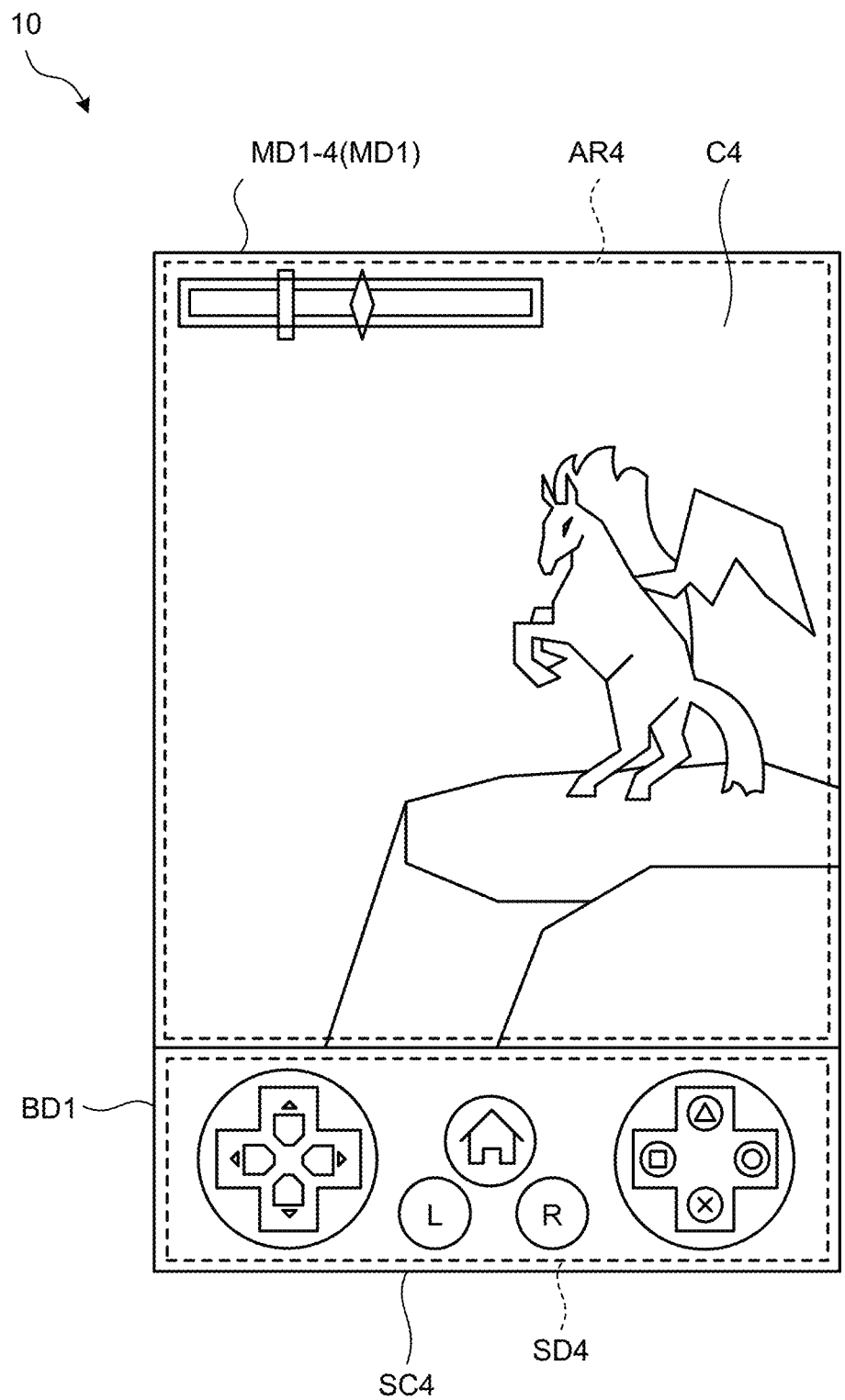
FIG. 19 is a diagram illustrating an example of information processing according to a modification of the present disclosure.
Figure 20:
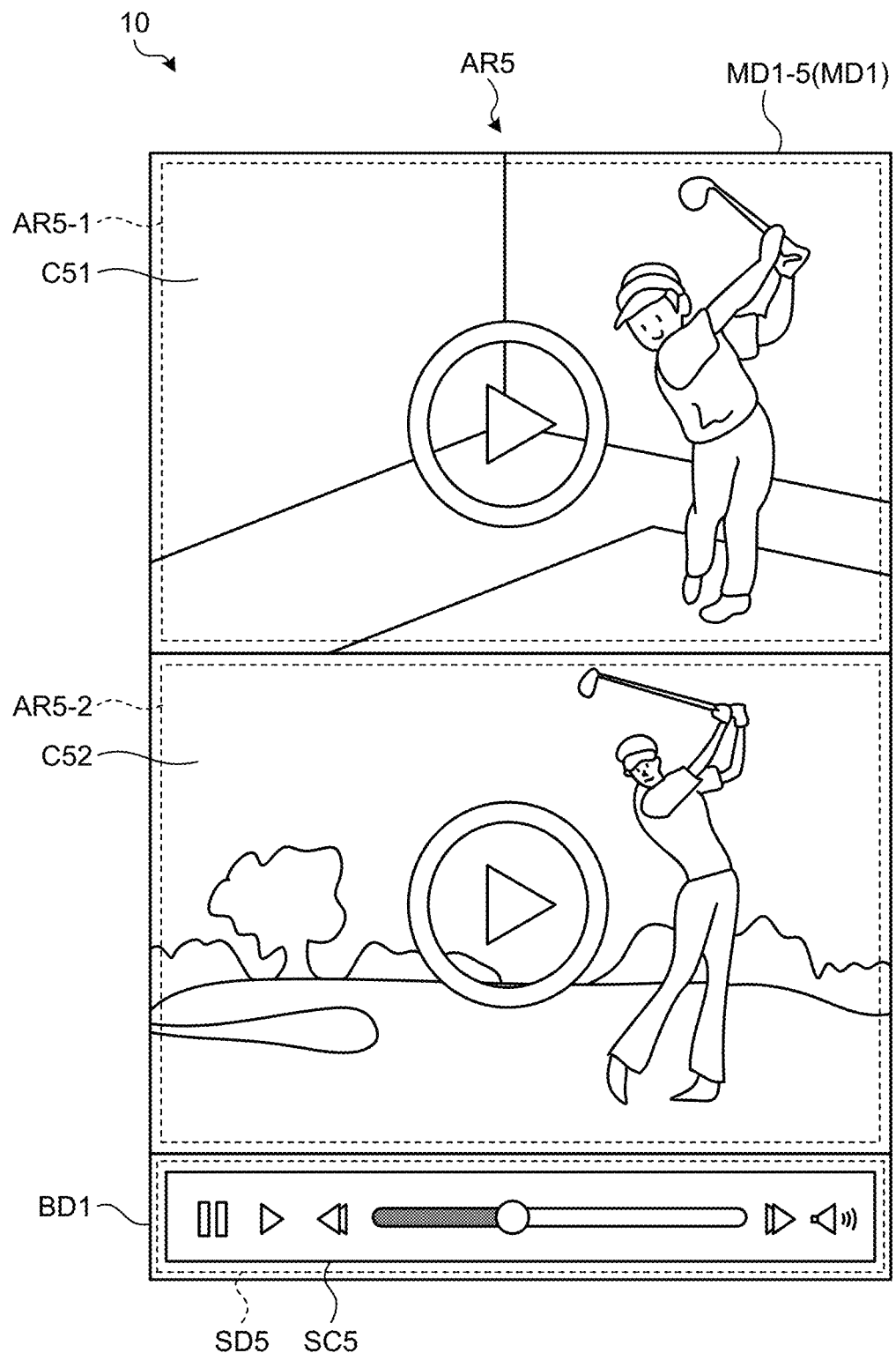
FIG. 20 is a view illustrating an example of information processing according to a modification of the present disclosure.

Next, a modification of the embodiment will be described with reference to FIGS. 19 to 20.

[1-6-1. Modification (1) of Embodiment]

First, a modification of the embodiment will be described with reference to FIG. 19. FIG. 19 is a diagram illustrating an example of information processing according to a modification of the present disclosure. Specifically, FIG. 19 is a diagram illustrating an example of a display control process of displaying operation content for operating applications in the housing display region.

The detection unit 151 detects the type of the application corresponding to the content displayed in the stretching region. Specifically, the detection unit 151 detects the application AP4 identified by the selected icon image based on the icon image selected by the user to display the content C4 in the stretching region AR4. When having detected the application AP4, the detection unit 151 detects that the type of the application AP4 is a game.

Subsequently, in accordance with the type of the application detected by the detection unit 151, the display control unit 153 displays operation content for operating an application in a housing display region located on a housing that houses the display device. Specifically, when the detection unit 151 has detected that the type of the application AP4 is a game, the display control unit 153 displays, in the housing display region SD4, the content SC4 that can be operated similarly to the case of a game controller.

[1-6-2. Modification (2) of Embodiment]

Next, a modification of the embodiment will be described with reference to FIG. 20. FIG. 20 is a view illustrating an example of information processing according to a modification of the present disclosure. Specifically, FIG. 20 is a view illustrating an example of a display control process of displaying video content C51 as a photographic image of a golf play of a user and video content C52 being a photographic image of a golf play of a professional golfer in a mutually comparable manner.

When the detection unit 151 has detected the selection operation on an icon image of an application AP51 corresponding to the video content C51, the display control unit 153 displays the video content C51 in a full-screen mode in a stretching region AR5.

Subsequently, when the detection unit 151 has detected the selection operation on an icon image of an application AP52 corresponding to video content C52, the display control unit 153 displays the video content C52 in a region AR5-2 close to the housing SD5 in the stretching region AR5. In addition, the display control unit 153 displays the video content C51 in a region AR5-1 of the stretching region AR5 on the opposite side of the housing SD5. Here, the stretching region AR5 is a region including the stretching region AR5-1 and the stretching region AR5-2.

Subsequently, the detection unit 151 detects the type of the application corresponding to the content displayed in the stretching region. For example, the detection unit 151 detects that the type of the application AP52 selected by the user to display the content C52 in the stretching region AR5-2 is a video.

Subsequently, in accordance with the type of the application detected by the detection unit 151, the display control unit 153 displays operation content for operating an application in a housing display region located on a housing that houses the display device. Specifically, when the detection unit 151 has detected that the type of the application AP52 is a video, the display control unit 153 displays, in the housing display region SD5, content SC5 that includes display of a reproduction bar, a fast-forward button, a rewind button, a pause button, and a volume control button for the video.

2. Other Embodiments

The processes according to the above-described embodiments and modifications may be performed in various different forms (modifications) other than the above-described embodiments and modifications.

Although the embodiments and the modifications described above are an example of a flexible display device that can be stretched from a tubular wound state, the display device is not limited to this example. Specifically, the display device may be a folding type device as described in FIGS. 1 to 6 of Patent Literature 1 or a sliding type device as described in FIGS. 54 to 59 of Patent Literature 1. In addition, the display device may be a foldable type in which the display device itself is folded.

3. Effects Related to Present Disclosure

As described above, the information processing apparatus (the terminal device 10 in the embodiment) according to the present disclosure includes the detection unit (detection unit 151 in the embodiment) and the display control unit (display control unit 153 in the embodiment). The detection unit detects a stretching operation on a flexible display device (first display unit 12 in the embodiment) that can be stretched from a state of being wound in a tubular shape. The display control unit displays the plurality of pieces of content in parallel in the stretching region stretched by the stretching operation in accordance with the mode of the stretching operation detected by the detection unit.

With this technique, the information processing apparatus according to the present disclosure enables the user to operate a plurality of applications simultaneously in parallel while referring to pieces of content corresponding to the plurality of applications. For example, the user of the terminal device 10 which is an example of the information processing apparatus according to the present disclosure can start the map application AP1, and then the user can start the application AP2 that provides a text chat function to talk about the place of the drinking party with an acquaintance while searching for the place of a drinking party (for example, Yoyogi). Furthermore, for example, the user of the terminal device 10 can further start the application AP3 that provides an SNS, search for information regarding high-rated restaurants near the candidate place of the drinking party (for example, Yoyogi) from posted information on the SNS, and the user can exchange the information regarding candidate restaurants for the drinking party with the acquaintance by using the application AP2 that provides the text chat function. Therefore, the information processing apparatus can improve usability in the display device.

Furthermore, the detection unit detects the size of the stretching region that changes in accordance with the stretching operation. The display control unit displays the plurality of pieces of content in parallel in the stretching region in accordance with the size of the stretching region detected by the detection unit.

With this technique, the information processing apparatus enables a plurality of applications to be operated simultaneously in parallel while referring to pieces of content corresponding to the plurality of applications displayed in a display region having a size freely selected by the user.

In addition, the display control unit displays an image by which an application is identifiable and which is provided for displaying the content corresponding to the application in the stretching region in a housing display region (second display unit 13 in the embodiment) located in a housing that houses the display device.

With this configuration, the information processing apparatus enables the user to display the content corresponding to the application in the stretching region by operation with one hand. For example, in a case where the user grips the housing with the left hand, the information processing apparatus makes it possible to display, with the left hand, the content corresponding to the application in the stretching region by performing the selection operation on the image displayed in the housing display region. Therefore, the information processing apparatus can improve usability in the display device.

Moreover, the display control unit scrollably displays, in the housing display region, the content including a display of a list of a plurality of images by which a plurality of applications is individually identifiable.

With this configuration, the information processing apparatus enables the user to perform a selection operation of selecting an application by operation with one hand. Therefore, the information processing apparatus can improve usability in the display device.

Furthermore, the detection unit detects a selection operation on an image displayed in the housing display region. The display control unit displays the content corresponding to the application identified by the image selected by the selection operation detected by the detection unit, in a region close to the housing in the stretching region.

With this configuration, the information processing apparatus can display the content corresponding to the application to be operated by the user in a region close to the hand by the operation using one hand, leading to improvement of the usability in the display device.

The detection unit detects a selection operation on an image corresponding to the content displayed in a region other than the region close to the housing, among a plurality of pieces of content displayed in parallel in the stretching region. The display control unit displays the content corresponding to the application identified by the image selected by the selection operation detected by the detection unit, in a region close to the housing in the stretching region.

With this configuration, the information processing apparatus makes it possible to change the position of the content displayed in the region other than the region close to the housing to the region close to the housing by operation with one hand without tapping or the like on the display device with the hand opposite to the hand with which the user holds the housing, making it possible to improve usability in the display device.

In addition, the display control unit displays, in parallel, the display content including the display of the text information input by the user and the input content corresponding to the input screen for the user to input the text information displayed on the display content.

With this configuration, the information processing apparatus can display the input screen in a region not overlapping the display content without displaying the input screen in a narrow region on the lower side of the display content as in the conventional case. That is, the information processing apparatus enables the user to input text information while referring to the text information displayed on the display content, as compared with a case where the input screen is superimposed on the display content, making it possible to improve usability in the display device.

In addition, the display control unit displays an image by which an application corresponding to the input content is identifiable so that the image is superimposed on a part of the input content.

As a result, the information processing apparatus enables the user to identify which input content corresponds to which application even when a plurality of pieces of input content is simultaneously displayed, making it possible to improve usability in the display device.

The detection unit detects a stretching operation on the display device that currently displays the display content in the stretching region. The display control unit displays the input content in the stretching region newly stretched by the stretching operation detected by the detection unit.

With this configuration, the information processing apparatus can display input content at a position not overlapping the display content, which enables the user to input text information while referring to the text information displayed on the display content, as compared with a case where the input screen is superimposed on the display content, making it possible to improve usability in the display device.

Furthermore, after receiving the notification related to the application, the detection unit detects the stretching operation on the display device. The display control unit displays the content of the application corresponding to the notification in the stretching region stretched by the stretching operation detected by the detection unit.

With this configuration, the information processing apparatus can start the application corresponding to a notification by a simple operation of just stretching the display device without the user performing an operation of selecting a specific application corresponding to the notification, making it possible to improve usability in the display device.

Furthermore, after receiving the notification related to the application, the detection unit detects the stretching operation on the display device. The display control unit displays information included in the notification in the stretching region stretched by the stretching operation detected by the detection unit.

With this configuration, the information processing apparatus enables immediate browsing of a notification by a simple operation of simply stretching the display device without the user performing an operation of selecting a specific application corresponding to the notification, making it possible to improve usability in the display device.

The detection unit detects reception of a notification related to an application. By changing the state of the image displayed in the housing display region, the display control unit displays information indicating reception of the notification detected by the detection unit in the housing display region.

With this configuration, the information processing apparatus enables reminding the user of the reception of the notification related to the application without disturbing the browsing of the content displayed in the stretching region, making it possible to improve the usability in the display device.

The detection unit detects reception of a notification related to an application. By changing the display position of the image displayed in the housing display region, the display control unit displays information indicating reception of the notification detected by the detection unit in the housing display region.

With this configuration, the information processing apparatus enables reminding the user of the reception of the notification related to the application without disturbing the browsing of the content displayed in the stretching region, making it possible to improve the usability in the display device.

The detection unit detects reception of a notification related to an application. The display control unit displays information indicating reception of a notification in a region based on an image indicating an application corresponding to the notification detected by the detection unit in the stretching region.

With this configuration, the information processing apparatus enables reminding the user of the reception of the notification related to the application without disturbing the browsing of the content displayed in the stretching region, making it possible to improve the usability in the display device.

The detection unit detects reception of a notification related to the first application. The display control unit displays information indicating reception of the notification detected by the detection unit in the stretching region that currently displays the content corresponding to the second application different from the first application.

With this configuration, the information processing apparatus enables reminding the user of the reception of the notification related to the application different from the application corresponding to the content displayed in the stretching region, making it possible to improve the usability in the display device.

In addition, the detection unit detects a winding operation of winding the stretching region in a state of being wound in a tubular shape. In accordance with the mode of the winding operation detected by the detection unit, the display control unit sequentially hides the plurality of pieces of content displayed in parallel in the stretching region before execution of the winding operation, from the housing side of housing the display device or from the opposite side of the housing that houses the display device.

With this configuration, the information processing apparatus can sequentially hide the display from the side of the housing in which the display device is housed or from the opposite side of the housing in which the display device is housed based on the setting of the user, making it possible to improve the usability in the display device.

In addition, the detection unit detects a winding operation of winding the stretching region in a state of being wound in a tubular shape. The display control unit displays a plurality of pieces of content in a reduced display mode while maintaining the scale of each of pieces of content displayed in parallel in the stretching region before execution of the winding operation in accordance with the mode of the winding operation detected by the detection unit.

With this configuration, the information processing apparatus can display a plurality of pieces of content in a reduced display mode while maintaining the scale of each of the pieces of content based on the setting of the user, making it possible to improve the usability in the display device.

In addition, the detection unit detects the type of the application corresponding to the content displayed in the stretching region. In accordance with the type of the application detected by the detection unit, the display control unit displays operation content for operating an application in a housing display region located on a housing that houses the display device.

With this configuration, the information processing apparatus can display operation content for operating an application in the housing display region in accordance with the type of the application corresponding to the content displayed in the stretching region, making it possible to improve the usability in the display device.

The effects described in the present specification are merely examples, and thus, there may be other effects, not limited to the exemplified effects.

4. Hardware Configuration

Figure 21:
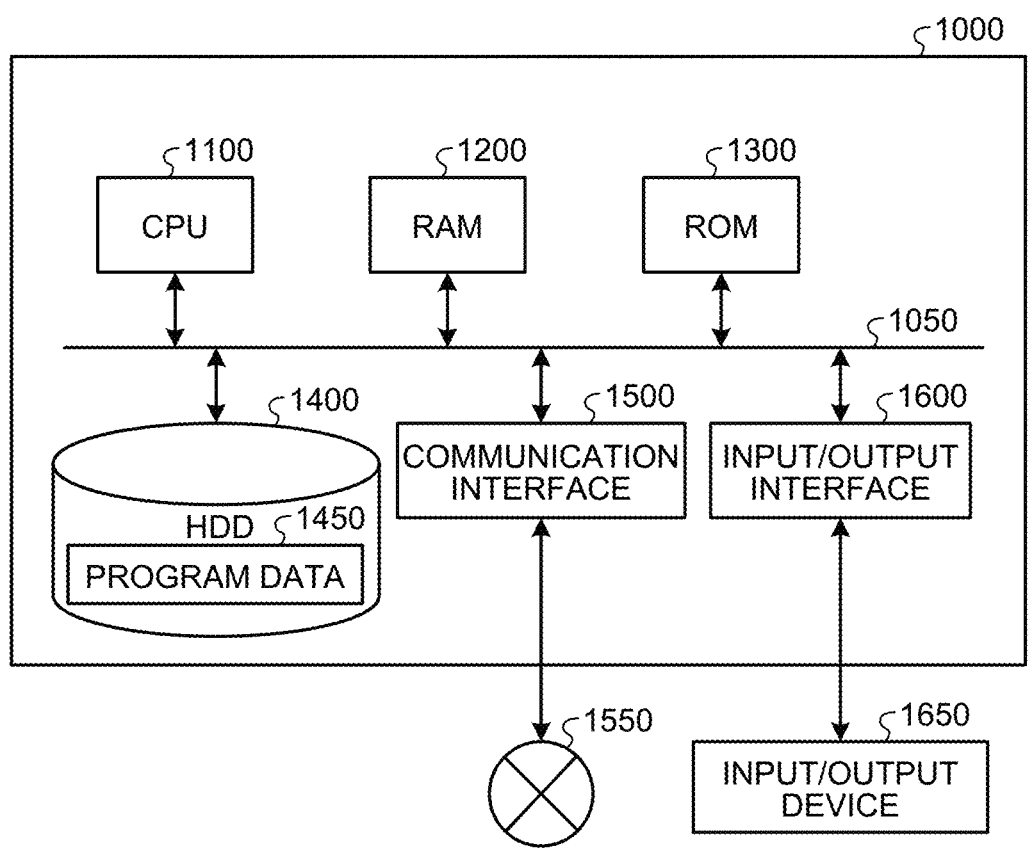
FIG. 21 is a hardware configuration diagram illustrating an example of a computer that implements functions of a terminal device.

The information apparatus such as the terminal device 10 according to the above-described embodiments and modifications are implemented by a computer 1000 having a configuration as illustrated in FIG. 21, for example. FIG. 21 is a hardware configuration diagram illustrating an example of the computer 1000 that implements the functions of the information processing apparatus such as the terminal device 10. Hereinafter, the terminal device 10 according to the embodiment will be described as an example. The computer 1000 includes a CPU 1100, RAM 1200, read only memory (ROM) 1300, a hard disk drive (HDD) 1400, a communication interface 1500, and an input/output interface 1600. Individual components of the computer 1000 are interconnected by a bus 1050.

The CPU 1100 operates based on a program stored in the ROM 1300 or the HDD 1400 so as to control each of components. For example, the CPU 1100 develops a program stored in the ROM 1300 or the HDD 1400 into the RAM 1200 and executes processes corresponding to various programs.

The ROM 1300 stores a boot program such as a basic input output system (BIOS) executed by the CPU 1100 when the computer 1000 starts up, a program dependent on hardware of the computer 1000, or the like.

The HDD 1400 is a non-transitory computer-readable recording medium that records a program executed by the CPU 1100, data used by the program, or the like. Specifically, the HDD 1400 is a recording medium that records an information processing program according to the present disclosure, which is an example of program data 1450.

The communication interface 1500 is an interface for connecting the computer 1000 to an external network 1550 (for example, the Internet). For example, the CPU 1100 receives data from other devices or transmits data generated by the CPU 1100 to other devices via the communication interface 1500.

The input/output interface 1600 is an interface for connecting between an input/output device 1650 and the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/output interface 1600 may function as a media interface for reading a program or the like recorded on predetermined recording medium (or simply medium). Examples of the media include optical recording media such as a digital versatile disc (DVD) or a phase change rewritable disk (PD), a magneto-optical recording medium such as a magneto-optical disk (MO), a tape medium, a magnetic recording medium, and semiconductor memory.

For example, when the computer 1000 functions as the terminal device 10 according to the embodiment, the CPU 1100 of the computer 1000 executes the information processing program loaded on the RAM 1200 so as to implement the functions of the control unit 15 or the like. Furthermore, the HDD 1400 stores the information processing program according to the present disclosure or data in the storage unit 14. While the CPU 1100 executes the program data 1450 read from the HDD 1400, the CPU 1100 may acquire these programs from another device via the external network 1550, as another example.

Note that the present technology can also have the following configurations.

(1)
An information processing apparatus comprising:
 a detection unit that detects a stretching operation on a display device having flexibility so as to be able to be stretched from a state of being wound in a tubular shape; and
 a display control unit that displays a plurality of pieces of content in parallel in a stretching region stretched by the stretching operation, in accordance with a mode of the stretching operation detected by the detection unit.

(2)
The information processing apparatus according to (1),
 wherein the detection unit
 detects a size of the stretching region that changes in accordance with the stretching operation, and
 the display control unit
 displays a plurality of pieces of content in parallel in the stretching region in accordance with the size of the stretching region detected by the detection unit.

(3)
The information processing apparatus according to (1) or (2),
 wherein the display control unit
 displays an image by which an application is identifiable and which is provided for displaying content corresponding to the application in the stretching region in a housing display region located in a housing that houses the display device.

(4)
The information processing apparatus according to (3),
 wherein the display control unit
 scrollably displays, in the housing display region, content including a display of a list of a plurality of the images by which a plurality of applications is individually identifiable.

(5)
The information processing apparatus according to (3) or (4),
 wherein the detection unit
 detects a selection operation on an image displayed in the housing display region, and
 the display control unit
 displays content corresponding to an application identified by an image selected by the selection operation detected by the detection unit, in a region close to the housing in the stretching region.

(6)
The information processing apparatus according to any of (3) to (5),
 wherein the detection unit
 detects a selection operation on the image corresponding to content displayed in a region other than a region close to the housing among the plurality of pieces of content displayed in parallel in the stretching region, and
 the display control unit
 displays content corresponding to an application identified by an image selected by the selection operation detected by the detection unit in a region close to the housing in the stretching region.

(7)
The information processing apparatus according to any of (1) to (6),
 wherein the display control unit
 displays, in parallel, display content including a display of text information input by a user and input content corresponding to an input screen for the user to input the text information displayed on the display content.

(8)
The information processing apparatus according to (7),
 wherein the display control unit
 displays an image by which an application corresponding to the input content is identifiable so that the image is superimposed on a part of the input content.

(9)
The information processing apparatus according to (7),
 wherein the detection unit
 detects a stretching operation on the display device on which the display content is displayed in the stretching region, and
 the display control unit
 displays the input content in a stretching region newly stretched by the stretching operation detected by the detection unit.

(10)
The information processing apparatus according to any of (1) to (9),
 wherein the detection unit
 detects a stretching operation on the display device after receiving a notification related to an application, and
 the display control unit
 displays content of an application corresponding to the notification in a stretching region stretched by the stretching operation detected by the detection unit.

(1.1)
The information processing apparatus according to any of (1) to (10),
 wherein the detection unit
 detects a stretching operation on the display device after receiving a notification related to an application, and
 the display control unit
 displays information included in the notification in a stretching region stretched by the stretching operation detected by the detection unit.

(12)

The information processing apparatus according to any of (3) to (5),
wherein the detection unit
detects reception of a notification related to an application, and
the display control unit
changes a state of the image displayed in the housing display region and displays, by this change, information indicating the reception of the notification detected by the detection unit, in the housing display region.

(13)

The information processing apparatus according to any of (3) to (5),
wherein the detection unit
detects reception of a notification related to an application, and
the display control unit
changes a display position of the image displayed in the housing display region and displays, by this change, information indicating the reception of the notification detected by the detection unit, in the housing display region.

(14)

The information processing apparatus according to any of (3) to (5),
wherein the detection unit
detects reception of a notification related to an application, and
the display control unit
displays information indicating the reception of the notification in a region based on the image indicating an application corresponding to the notification detected by the detection unit, in the stretching region.

(15)

The information processing apparatus according to (14),
wherein the detection unit
detects reception of a notification related to a first application, and
the display control unit
displays information indicating the reception of the notification detected by the detection unit in the stretching region that currently displays content corresponding to a second application different from the first application.

(16)

The information processing apparatus according to any of (1) to (15),
wherein the detection unit
detects a winding operation of winding the stretching region in a state of being wound in a tubular shape, and
the display control unit
performs, in accordance with a mode of the winding operation detected by the detection unit, operation of hiding a plurality of pieces of content displayed in parallel, in the stretching region before the winding operation is performed, sequentially from a side of a housing in which the display device is housed or from an opposite side of the housing in which the display device is housed.

(17)

The information processing apparatus according to any of (1) to (16),
wherein the detection unit
detects a winding operation of winding the stretching region in a state of being wound in a tubular shape, and
the display control unit
performs, in accordance with a mode of the winding operation detected by the detection unit, operation of displaying, in a reduced display mode, a plurality of pieces of content displayed in parallel in the stretching region before the winding operation is performed, while maintaining a scale of each of the pieces of content.

(18)

The information processing apparatus according to any of (1) to (17),
in which the detection unit
detects a size of the stretching region that changes in accordance with a winding operation of winding the stretching region in a state of being wound in a tubular shape, and
in a case where the size of the stretching region detected by the detection unit is a predetermined threshold or less, the display control unit
hides all content displayed in the stretching region before the winding operation is performed.

(19)

The information processing apparatus according to any of (1) to (18),
wherein the detection unit
detects a type of an application corresponding to content displayed in the stretching region, and
the display control unit
displays operation content for operating the application in a housing display region located in a housing that houses the display device, in accordance with the type of the application detected by the detection unit.

(20)

An information processing method applicable to execute processes comprising:
detecting a stretching operation on a display device having flexibility so as to be able to be stretched from a state of being wound in a tubular shape; and
displaying a plurality of pieces of content in parallel in a stretching region stretched by the stretching operation, in accordance with a mode of the stretching operation detected.

(21)

An information processing program for causing a computer to function as:
a detection unit that detects a stretching operation on a display device having flexibility so as to be able to be stretched from a state of being wound in a tubular shape; and
a display control unit that displays a plurality of pieces of content in parallel in a stretching region stretched by the stretching operation, in accordance with a mode of the stretching operation detected by the detection unit.

REFERENCE SIGNS LIST

10 TERMINAL DEVICE
11 COMMUNICATION UNIT
12 FIRST DISPLAY UNIT
13 SECOND DISPLAY UNIT
14 STORAGE UNIT
15 CONTROL UNIT
151 DETECTION UNIT
152 REQUEST UNIT
153 DISPLAY CONTROL UNIT

The invention claimed is:

1. An information processing apparatus, comprising:
processing circuitry configured to
detect a stretching operation on a display device having flexibility so as to be able to be stretched from a state of being wound in a tubular shape,
display a plurality of pieces of content in parallel in a stretching region stretched by the stretching operation, in accordance with a mode of the stretching operation,
in response to detecting the stretching operation, display, in parallel, the plurality of pieces of content including a display of text information input by a user and input contents corresponding to an input screen for the user, wherein the input contents are displayed in a stretching region newly stretched by the detected stretching operation, wherein the plurality of pieces of content include at least a first display content and a second display content, and the input contents include at least a first input content corresponding to the first display content and a second input content corresponding to the second display content,
display images by which applications corresponding to the input contents are identifiable, respectively, so that the images are superimposed on a part of the corresponding input contents, respectively, and the applications including at least a first application corresponding to the first input contents and a second application corresponding to the second input contents, and the images include at least a first image corresponding to the first application and a second image corresponding to the second application,
detect a selection operation on one of the images, and
in response to detecting the selection operation on one of the images, switch to displaying the text information for the input content corresponding to the application identified by the selected image.

2. The information processing apparatus according to claim 1,
wherein the processing circuitry is further configured to
detect a size of the stretching region that changes in accordance with the stretching operation, and
display a plurality of pieces of content in parallel in the stretching region in accordance with the size of the stretching region.

3. The information processing apparatus according to claim 1,
wherein the processing circuitry is further configured to
display an image by which an application is identifiable and which is provided for displaying content corresponding to the application in the stretching region in a housing display region located in a housing that houses the display device.

4. The information processing apparatus according to claim 3,
wherein the processing circuitry is further configured to
scrollably display, in the housing display region, content including a display of a list of a plurality of the images by which a plurality of applications is individually identifiable.

5. The information processing apparatus according to claim 3,
wherein processing circuitry is further configured to
detect a selection operation on an image displayed in the housing display region, and
display content corresponding to an application identified by an image selected by the selection operation in a region close to the housing in the stretching region.

6. The information processing apparatus according to claim 3,
wherein the processing circuitry is further configured to
detect a selection operation on the image corresponding to content displayed in a region other than a region close to the housing among the plurality of pieces of content displayed in parallel in the stretching region, and
display content corresponding to an application identified by an image selected by the selection operation in a region close to the housing in the stretching region.

7. The information processing apparatus according to claim 3,
wherein the processing circuitry is further configured to
detect reception of a notification related to an application, and
change a state of the image displayed in the housing display region and display, by this change, information indicating the reception of the notification, in the housing display region.

8. The information processing apparatus according to claim 3,
wherein the processing circuitry is further configured to
detect reception of a notification related to an application, and
change a display position of the image displayed in the housing display region and display, by this change, information indicating the reception of the notification, in the housing display region.

9. The information processing apparatus according to claim 3,
wherein the processing circuitry is further configured to
detect reception of a notification related to an application, and
display information indicating the reception of the notification in a region based on the image indicating an application corresponding to the notification, in the stretching region.

10. The information processing apparatus according to claim 9,
wherein the processing circuitry is further configured to
detect reception of a notification related to a first application, and
display information indicating the reception of the notification in the stretching region that currently displays content corresponding to a second application different from the first application.

11. The information processing apparatus according to claim 1,
wherein the processing circuitry is further configured to
display, in parallel, display content including a display of text information input by a user and input content corresponding to an input screen for the user to input the text information displayed on the display content.

12. The information processing apparatus according to claim 11,
wherein the processing circuitry is further configured to
display an image by which an application corresponding to the input content is identifiable so that the image is superimposed on a part of the input content.

13. The information processing apparatus according to claim 11,
wherein the processing circuitry is further configured to
detect a stretching operation on the display device on which the display content is displayed in the stretching region, and display the input content in a stretching region newly stretched by the stretching operation.

14. The information processing apparatus according to claim 1,
wherein the processing circuitry is further configured to
detect a stretching operation on the display device after receiving a notification related to an application, and
display content of an application corresponding to the notification in a stretching region stretched by the stretching operation.

15. The information processing apparatus according to claim 1,
wherein the processing circuitry is further configured to
detect a stretching operation on the display device after receiving a notification related to an application, and
display information included in the notification in a stretching region stretched by the stretching operation.

16. The information processing apparatus according to claim 1,
wherein the processing circuitry is further configured to
detect a winding operation of winding the stretching region in a state of being wound in a tubular shape, and
perform, in accordance with a mode of the winding operation, operation of displaying, in a reduced display mode, a same plurality of pieces of content displayed in parallel in the stretching region before the winding operation is performed, while maintaining a scale of each of the pieces of content.

17. The information processing apparatus according to claim 1,
wherein the processing circuitry is further configured to
detect a type of an application corresponding to content displayed in the stretching region, and
display operation content for operating the application in a housing display region located in a housing that houses the display device, in accordance with the type of the application.

18. An information processing method applicable to execute processes comprising:
detecting a stretching operation on a display device having flexibility so as to be able to be stretched from a state of being wound in a tubular shape;
displaying a plurality of pieces of content in parallel in a stretching region stretched by the stretching operation, in accordance with a mode of the stretching operation detected;
in response to detecting the stretching operation, displaying, in parallel, the plurality of pieces of content including a display of text information input by a user and input contents corresponding to an input screen for the user, wherein the input contents are displayed in a stretching region newly stretched by the detected stretching operation, wherein the plurality of pieces of content include at least a first display content and a second display content, and the input contents include at least a first input content corresponding to the first display content and a second input content corresponding to the second display content;
displaying images by which applications corresponding to the input contents are identifiable, respectively, so that the images are superimposed on a part of the corresponding input contents, respectively, and the applications including at least a first application corresponding to the first input contents and a second application corresponding to the second input contents, and the images include at least a first image corresponding to the first application and a second image corresponding to the second application;
detecting a selection operation on one of the images, and
in response to detecting the selection operation on one of the images, switching to displaying the text information for the input content corresponding to the application identified by the selected image.

19. A non-transitory computer-readable storage medium storing computer-readable instructions thereon which, when executed by a computer, cause the computer to perform a method, the method comprising:
detecting a stretching operation on a display device having flexibility so as to be able to be stretched from a state of being wound in a tubular shape;
displaying a plurality of pieces of content in parallel in a stretching region stretched by the stretching operation, in accordance with a mode of the stretching operation detected by the detection procedure;
in response to detecting the stretching operation, displaying, in parallel, the plurality of pieces of content including a display of text information input by a user and input contents corresponding to an input screen for the user, wherein the input contents are displayed in a stretching region newly stretched by the detected stretching operation, wherein the plurality of pieces of content include at least a first display content and a second display content, and the input contents include at least a first input content corresponding to the first display content and a second input content corresponding to the second display content;
displaying images by which applications corresponding to the input contents are identifiable, respectively, so that the images are superimposed on a part of the corresponding input contents, respectively, and the applications including at least a first application corresponding to the first input contents and a second application corresponding to the second input contents, and the images include at least a first image corresponding to the first application and a second image corresponding to the second application;
detecting a selection operation on one of the images, and
in response to detecting the selection operation on one of the images, switching to displaying the text information for the input content corresponding to the application identified by the selected image.

* * * * *